US012395772B2

(12) United States Patent
Enomoto et al.

(10) Patent No.: US 12,395,772 B2
(45) Date of Patent: Aug. 19, 2025

(54) SOUND PICKUP DEVICE

(71) Applicant: Panasonic Intellectual Property Corporation of America, Torrance, CA (US)

(72) Inventors: Seigo Enomoto, Kyoto (JP); Yoshifumi Hirose, Kyoto (JP); Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 249 days.

(21) Appl. No.: 18/137,789

(22) Filed: Apr. 21, 2023

(65) Prior Publication Data

US 2023/0262374 A1 Aug. 17, 2023

Related U.S. Application Data

(63) Continuation of application No. PCT/JP2021/037473, filed on Oct. 8, 2021.

(30) Foreign Application Priority Data

Nov. 10, 2020 (JP) ................................ 2020-187537

(51) Int. Cl.
*H04R 1/08* (2006.01)

(52) U.S. Cl.
CPC ........... *H04R 1/08* (2013.01); *H04R 2430/00* (2013.01)

(58) Field of Classification Search
None
See application file for complete search history.

(56) References Cited

U.S. PATENT DOCUMENTS

| | | | |
|---|---|---|---|
| 2018/0376239 | A1 | 12/2018 | Hayashida et al. |
| 2021/0329374 | A1 | 10/2021 | Kanamori |

FOREIGN PATENT DOCUMENTS

| | | | |
|---|---|---|---|
| JP | 2-86397 | 3/1990 | |
| JP | 2019-9667 | 1/2019 | |
| WO | WO-2018157098 A1 * | 8/2018 | ............ G06F 16/58 |
| WO | 2020/166634 | 8/2020 | |

OTHER PUBLICATIONS

International Search Report (ISR) issued on Dec. 28, 2021 in International (PCT) Application No. PCT/JP2021/037473.
Lloyd J. Griffiths, et al., "An Alternative Approach to Linearly Constrained Adaptive Beamforming", IEEE Transactions on Antennas and Propagation, vol. AP-30, No. 1, Jan. 1982, pp. 27-34.

* cited by examiner

*Primary Examiner* — Kenny H Truong
(74) *Attorney, Agent, or Firm* — Wenderoth, Lind & Ponack, L.L.P.

(57) ABSTRACT

A sound pickup device includes microphone elements arranged three-dimensionally in a distributed manner. A total number of effective microphone pairs is greater than a total number of the microphone elements, the effective microphone pairs each being a combination of two microphone elements having a distance less than a distance D between each other. The distance D is represented by D=c/2f, where f represents a frequency of a target sound obtained from each of the microphone elements and c represents a velocity of the target sound. Any one of straight lines each of which connects the two microphone elements of a different one of the effective microphone pairs is not parallel to any other of the straight lines.

5 Claims, 23 Drawing Sheets

SOUND PICKUP DEVICE

CROSS REFERENCE TO RELATED APPLICATIONS

This is a continuation application of PCT International Application No. PCT/JP2021/037473 filed on Oct. 8, 2021, designating the United States of America, which is based on and claims priority of Japanese Patent Application No. 2020-187537 filed on Nov. 10, 2020. The entire disclosures of the above-identified applications, including the specifications, drawings and claims are incorporated herein by reference in their entirety.

FIELD

The present disclosure relates to a sound pickup device for beamforming.

BACKGROUND

Beamforming is a technique of generating a signal emphasizing a sound from a target sound direction by using sound signals obtained from microphone elements. Non-Patent Literature (NPL) 1 discloses a generalized sidelobe canceller (GSC) as an example of a beamformer using adaptive filters.

CITATION LIST

Non-Patent Literature

NPL1: L. Griffiths and C. W. Jim, "An alternative approach to linearly constrained adaptive beamforming", IEEE Trans. Antennas Propagation, vol. AP-30, pp 27-34, January 1982.

SUMMARY

Technical Problem

The present disclosure provides a sound pickup device that effectively reduces sound other than a target sound.

Solution to Problem

A sound pickup device according to an aspect of the present disclosure includes a plurality of microphone elements that are arranged three-dimensionally in a distributed manner, wherein among microphone pairs each of which is a different combination of two microphone elements of the plurality of microphone elements, a total number of effective microphone pairs is greater than a total number of the plurality of microphone elements, the effective microphone pairs each being a combination of two microphone elements having a distance less than a distance D between each other, the distance D is represented by D=c/2f, where f represents a frequency of a target sound obtained from the plurality of microphone elements and c represents a velocity of the target sound, and any one of straight lines each of which connects the two microphone elements of a different one of the effective microphone pairs is not parallel to any other of the straight lines.

Advantageous Effects

A sound pickup device according to an aspect of the present disclosure can effectively reduce sound other than a target sound.

DESCRIPTION OF EMBODIMENT

Hereinafter, an embodiment will be described with reference to the Drawings. The embodiment described below shows a general or specific example. The numerical values, shapes, materials, constituent elements, the arrangement and connection of the constituent elements, etc. shown in the embodiment below are mere examples, and therefore do not limit the scope of the present disclosure. Moreover, among the constituent elements in the embodiment below, constituent elements not recited in any one of the independent claims defining the broadest concept are described as arbitrary constituent elements.

Furthermore, the Drawings are schematic drawings and are not necessarily precise depictions. Furthermore, elements that are essentially the same share the same reference signs in the respective Drawings, and overlapping explanations thereof may be omitted or simplified.

Furthermore, in the embodiment below, when a sound from a certain direction is a main target to be output by a sound pickup device, the certain direction is referred to as a target sound direction and the sound is referred to as a target sound. Furthermore, sound other than the target sound may be referred to as noise.

Embodiment (Configuration of Sound Pickup Device)

Figure 1:
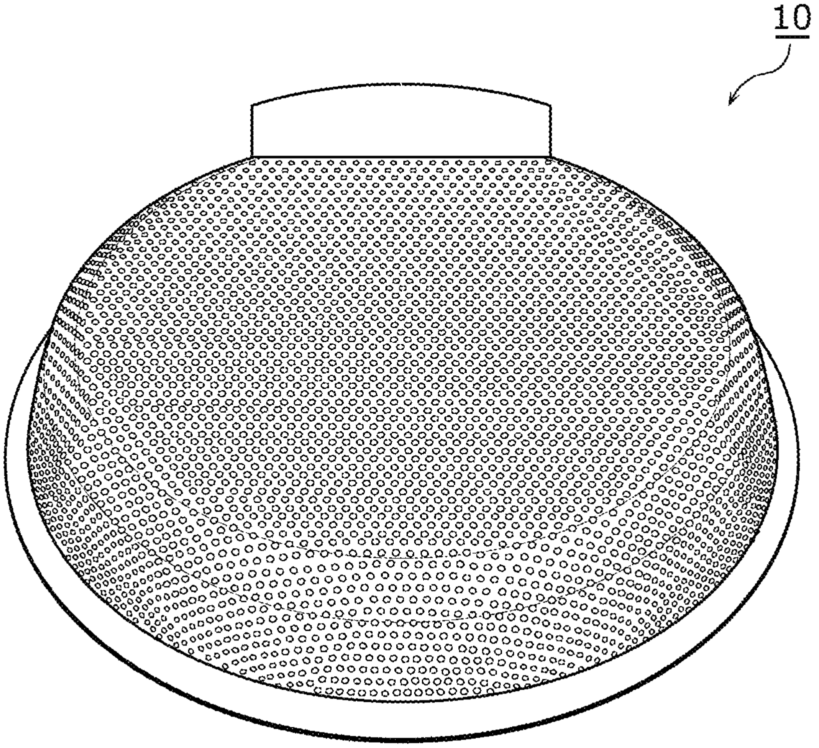
FIG. 1 is an external perspective view of a sound pickup device according to an embodiment.
Figure 2:
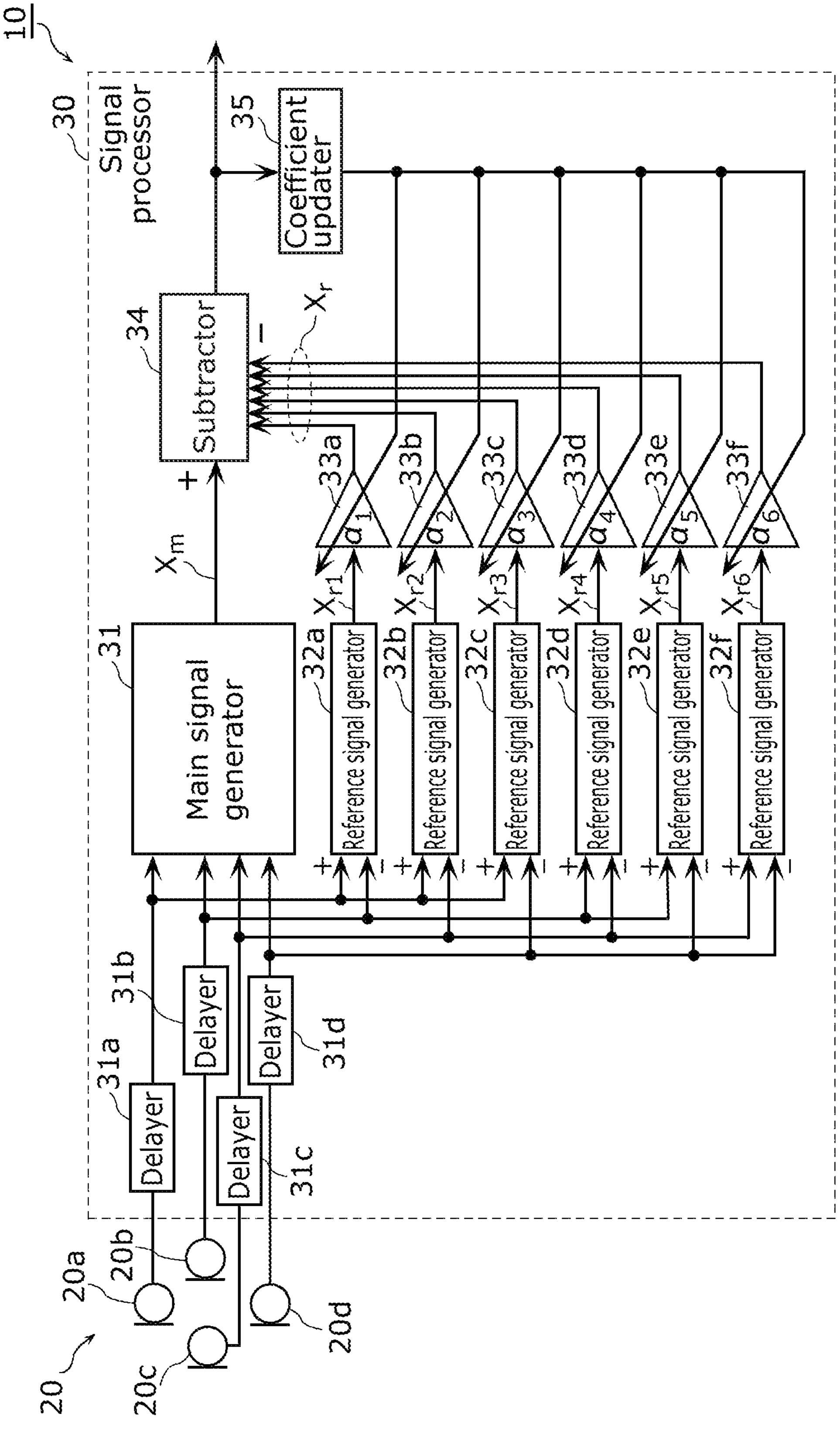
FIG. 2 is a block diagram illustrating a functional configuration of the sound pickup device according to the embodiment.

Hereinafter, a configuration of a sound pickup device according to an embodiment will be described with reference to FIG. 1 and FIG. 2. FIG. 1 is an external perspective view of the sound pickup device according to the embodiment. FIG. 2 is a block diagram illustrating a functional configuration of the sound pickup device according to the embodiment.

As illustrated in FIG. 1, sound pickup device 10 according to the embodiment is a substantially disk-shaped device. For example, sound pickup device 10 is placed on a desk and used for picking up voice during a teleconference or the like. It should be noted that the shape of sound pickup device 10 is not limited to a substantially disk shape. As illustrated in FIG. 2, sound pickup device 10 includes microphone elements 20*a* to 20*d* and signal processor 30, inside the body as illustrated in FIG. 1. Microphone elements 20*a* to 20*d* constitute microphone array 20. It should be noted that sound pickup device 10 does not necessarily include signal processor 30, and signal processor 30 may be implemented as a separate device from sound pickup device 10.

Microphone elements 20*a* to 20*d* constitute microphone array for generating main signal $X_m$ and reference signals $X_{r1}$ to $X_{r6}$ that are used for beamforming. In other words, microphone elements 20*a* to 20*d* are used for enabling signal processor 30 that is a beamformer to obtain sound signals. Microphone elements 20*a* to 20*d* are arranged on the same plane. Although sound pickup device includes four microphone elements 20*a* to 20*d* in the embodiment, the total number of microphone elements is not particularly limited to this example. The total number of microphone elements may be an even number or an odd number. For example, sound pickup device 10 may include four or more microphone elements.

Signal processor 30 is a beamformer that performs beamforming using sound signals obtained from microphone elements 20*a* to 20*d*. Beamforming by signal processor 30 is signal processing for forming a directivity so that sensitivity to a target sound direction is ensured and noise is at a dead angle. In other words, according to beamforming by signal processor 30, noise coming from any direction other than the target sound direction is reduced. Although each of microphone elements 20*a* to 20*d* is an omnidirectional microphone element, sound pickup device 10 achieves high sensitivity to the target sound direction through beamforming by signal processor 30.

More specifically, signal processor 30 has a configuration similar to that of a generalized sidelobe canceller. For example, signal processor 30 is implemented as a processor such as a digital signal processor (DSP) but may also be implemented as a microcomputer or a circuit. Moreover, signal processor 30 may be implemented as a combination of two or more of a processor, a microcomputer, and a circuit. Signal processor 30 includes delayers 31*a* to 31*d*, main signal generator 31, reference signal generators 32*a* to 32*f*, adaptive filters 33*a* to 33*f*, subtractor 34, and coefficient updater 35.

Delayers 31*a* to 31*d* correspond one-to-one to sound signals obtained from microphone elements 20*a* to 20*d*. Delayers 31*a* to 31*d* delay the sound signals obtained from microphone elements 20*a* to 20*d* according to the target sound direction, and output the delayed sound signals as output signals.

Main signal generator 31 is an example of a first signal generator, and generates main signal $X_m$ by adding up sound signals that have been obtained from microphone elements 20*a* to 20*d* and delayed by delayers 31*a* to 31*d*, respectively, according to the target sound direction. Main signal $X_m$ is an example of a first signal.

Each of reference signal generators 32*a* to 32*f* is an example of a second signal generator. Reference signal generators 32*a* to 32*f* correspond one-to-one to six microphone pairs each of which is a different combination of two microphone elements of microphone elements 20*a* to 20*d*. One reference signal generator generates a reference signal by performing subtraction between two sound signals that have been obtained from two microphone elements of a corresponding one of the microphone pairs and delayed by corresponding two of delayers 31*a* to 31*d* according to the target sound direction. Each of reference signals $X_{r1}$ to $X_{r6}$ is an example of a second signal.

Moreover, adaptive filters 33*a* to 33*f* correspond one-to-one to reference signal generators 32*a* to 32*f*. Adaptive filters 33*a* to 33*f* apply filter coefficients $\alpha_1$ to $\alpha_6$ to reference signals $X_{r1}$ to $X_{r6}$ generated by reference signal generators 32*a* to 32*f*, respectively.

For example, reference signal generator 32*a* generates reference signal $X_{r1}$ by performing subtraction between sound signals (output signals from delayers 31*a* and 31*b*) that have been obtained from microphone elements 20*a* and 20*b* and delayed by delayers 31*a* and 31*b*, respectively, according to the target sound direction. Adaptive filter 33*a* applies filter coefficient $\alpha_1$ to reference signal $X_{r1}$.

Similarly, reference signal generator 32*b* generates reference signal $X_{r2}$ by performing subtraction between sound signals (output signals from delayers 31*a* and 31*c*) that have been obtained from microphone elements 20*a* and 20*c* and delayed by delayers 31*a* and 31*c*, respectively, according to the target sound direction. Adaptive filter 33*b* applies filter coefficient $\alpha_2$ to reference signal $X_{r2}$.

Reference signal generator 32*c* generates reference signal $X_{r3}$ by performing subtraction between sound signals (output signals from delayers 31*a* and 31*d*) that have been obtained from microphone elements 20*a* and 20*d* and delayed by delayers 31*a* and 31*d*, respectively, according to the target sound direction. Adaptive filter 33*c* applies filter coefficient $\alpha_3$ to reference signal $X_{r3}$.

Reference signal generator 32*d* generates reference signal $X_{r4}$ by performing subtraction between sound signals (output signals from delayers 31*b* and 31*c*) that have been obtained from microphone elements 20*b* and 20*c* and delayed by delayers 31*b* and 31*c*, respectively, according to the target sound direction. Adaptive filter 33*d* applies filter coefficient $\alpha_4$ to reference signal $X_{r4}$.

Reference signal generator 32*e* generates reference signal $X_{r5}$ by performing subtraction between sound signals (output signals from delayers 31*b* and 31*d*) that have been obtained from microphone elements 20*b* and 20*d* and delayed by delayers 31*b* and 31*d*, respectively, according to the target sound direction. Adaptive filter 33*e* applies filter coefficient $\alpha_5$ to reference signal $X_{r5}$.

Reference signal generator 32*f* generates reference signal $X_{r6}$ by performing subtraction between sound signals (output signals from delayers 31*c* and 31*d*) that have been obtained from microphone elements 20*c* and 20*d* and delayed by delayers 31*c* and 31*d*, respectively, according to the target sound direction. Adaptive filter 33*f* applies filter coefficient $\alpha_6$ to reference signal $X_{r6}$.

Subtractor 34 subtracts, from main signal $X_m$ generated, reference signals $X_{r1}$ to $X_{r6}$ to which filter coefficients $\alpha_1$ to $\alpha_6$ have been applied. Output signal Y obtained by the subtraction is represented by Formula 1 below. Output signal Y is an example of a third signal. In Formula 1, n represents the number of microphone pairs. Accordingly, n is a natural number, and n is six (n=6) in sound pickup device 10.

(Math. 1)

$$Y=X_m-\Sigma_{k=1}^{n}\alpha_k X_{rk} \qquad \text{(Formula 1)}$$

Coefficient updater 35 updates filter coefficients $\alpha_1$ to $\alpha_6$, based on output signal Y obtained through the subtraction by subtractor 34.

Figure 3:
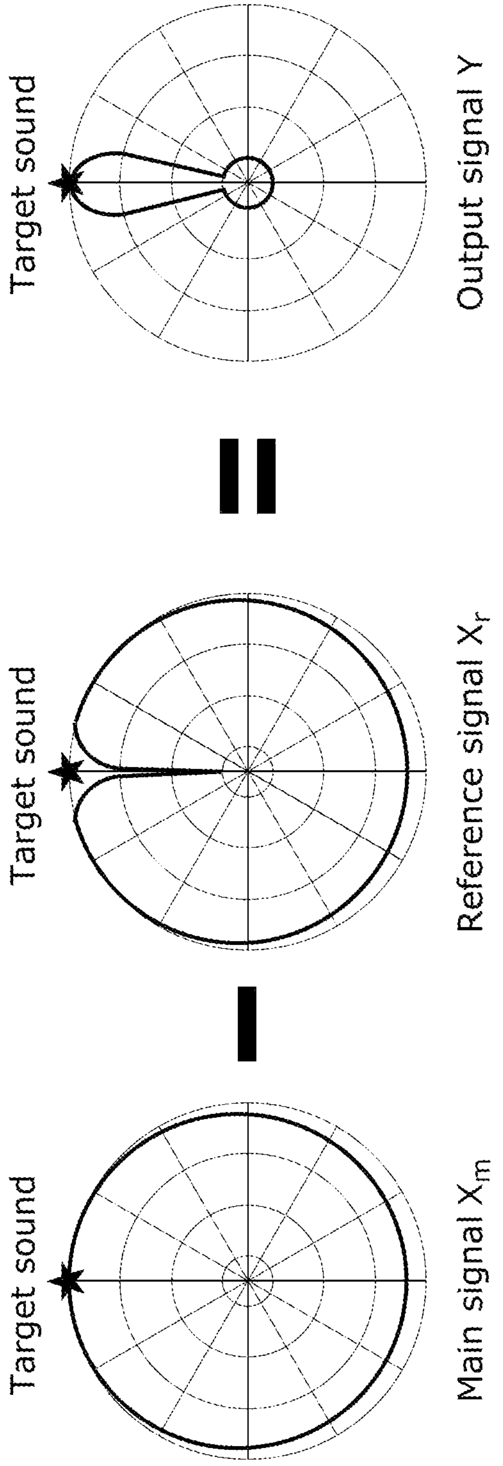
FIG. 3 is a diagram schematically illustrating a calculation formula of an output signal based on sensitivity characteristics of a main signal, a reference signal, and the output signal.

FIG. 3 is a diagram schematically illustrating Formula 1 based on sensitivity characteristics of main signal $X_m$, reference signal $X_r$, and output signal Y. It should be noted that reference signal $X_r$ represents the total of reference signals $X_{r1}$ to $X_{r6}$ to which filter coefficients $\alpha_1$ to $\alpha_6$ have been applied ($\alpha_1X_{r1}+\alpha_2X_{r2}+\alpha_3X_{r3}+\alpha_4X_{r4}+\alpha_5X_{r5}+\alpha_6X_{r6}$). The sensitivity characteristic is, in other words, directivity.

As illustrated in FIG. 3, main signal $X_m$ has high sensitivity to all directions. In contrast, reference signal $X_r$ has low sensitivity to the target sound direction due to adaptive filters 33*a* to 33*f* and coefficient updater 35. Accordingly, output signal Y that is obtained by subtracting reference signal $X_r$ from main signal $X_m$ has high sensitivity to the target sound direction. It should be noted that the target sound direction is, in other words, a beam direction.

(Arrangement of Microphone Elements)

In sound pickup device 10, signal processor 30 can change a beam direction in output signal Y. For example, sound pickup device includes a user interface such as a touch screen or an operation button, and signal processor 30 changes the beam direction based on operation by a user through the user interface. Alternatively, signal processor 30 automatically changes the beam direction by detecting a sound volume or the like.

When signal processor 30 performs beamforming with a variable beam direction as above, sensitivity to directions other than the beam direction needs to be reduced as much as possible in output signal Y, whichever direction the beam direction is. Therefore, in sound pickup device 10, the arrangement of microphone elements 20*a* to 20*d* is determined in order to ensure such performance.

First, in sound pickup device 10, the total number of effective microphone pairs is greater than the total number of microphone elements 20*a* to 20*d*. Here, among microphone pairs each of which is a different combination of two microphone elements of microphone elements 20*a* to 20*d*, an effective microphone pair is a microphone pair in which a distance between the two microphone elements is less than distance D. Distance D is represented by D=c/2f, where f represents a frequency of a target sound obtained from microphone elements 20*a* to 20*d* and *c* represents a velocity of the target sound. In sound pickup device 10, the total number of the effective microphone pairs is six and the total number of the microphone elements is four.

It should be noted that distance D varies depending on the frequency of the target sound. For example, when the frequency of the target sound is 8 kHz and the velocity of the target sound is c=34000 cm/s, distance D is 2.125 cm. Moreover, when the frequency of the target sound is 4 kHz and the velocity of the target sound is c=34000 cm/s, distance D is 4.25 cm.

In some cases, a reference signal that is calculated using a noneffective microphone pair in which the distance between the two microphone elements is greater than or equal to distance D does not have a sensitivity characteristic that is assumed from the arrangement of the noneffective microphone pair, due to occurrence of aliasing in signal processing or the like. In other words, a reference signal that is calculated using the noneffective microphone pair may have an unexpected sensitivity characteristic, and therefore generation of highly accurate output signal Y may be hindered. In sound pickup device 10, generation of highly accurate output signal Y is achieved since the total number of the effective microphone pairs is greater than the total number of microphone elements 20*a* to 20*d*.

It should be noted that all of the microphone pairs obtainable from microphone elements 20*a* to 20*d* are the effective microphone pairs in sound pickup device 10. Accordingly, the total number of the microphone pairs obtainable from microphone elements 20*a* to 20*d* is equal to the total number of the effective microphone pairs. However, there may be a case where some of the microphone pairs obtainable from microphone elements 20*a* to 20*d* are not the effective microphone pairs.

Figure 4:
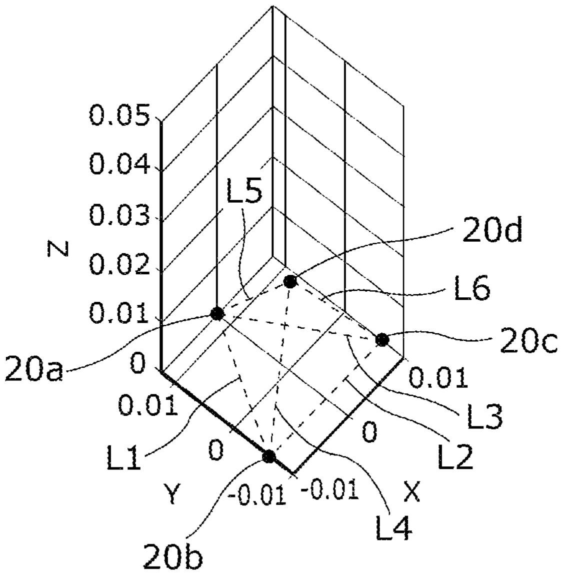
FIG. 4 is a diagram illustrating three-dimensional arrangement example 1 of microphone elements.

Moreover, microphone elements 20*a* to 20*d* are arranged three-dimensionally in a distributed manner. FIG. 4 is a diagram illustrating three-dimensional arrangement example 1 of microphone elements 20*a* to 20*d*. In FIG. 4, the unit of the numerical values shown on the X-axis, the Y-axis, and the Z-axis is meter.

In three-dimensional arrangement example 1 in FIG. 4, microphone elements 20*a* to 20*d* are arranged at the vertices of a regular tetrahedron with a side length of approximately 2.1 cm (0.021 in the coordinates in FIG. 4). Specifically, microphone elements 20*a* to 20*c* are located on the XY plane where Z=0. The coordinates of microphone element 20*d* are (0, 0, Z1, where Z1=approximately 0.0171) and microphone element 20*d* is located on the positive side of the Z-axis direction with respect to the XY plane where Z=0. It should be noted that the side length of 2.1 cm of the regular tetrahedron is determined assuming a half wave length of a frequency of 8 kHz.

In three-dimensional arrangement example 1, any one of straight lines each of which connects the two microphone elements of a different one of the effective microphone pairs is not parallel to any other of the straight lines. Specifically, in FIG. 4, straight line (line segment) L1 illustrated by a broken line is not parallel to any other straight lines L2 to L6. The same applies to straight lines L2 to L6. In other words, all of the straight lines each of which connects the two microphone elements of a different one of the effective microphone pairs are not parallel to one another.

(Sensitivity Characteristic of Reference Signal 1)

Figure 5:
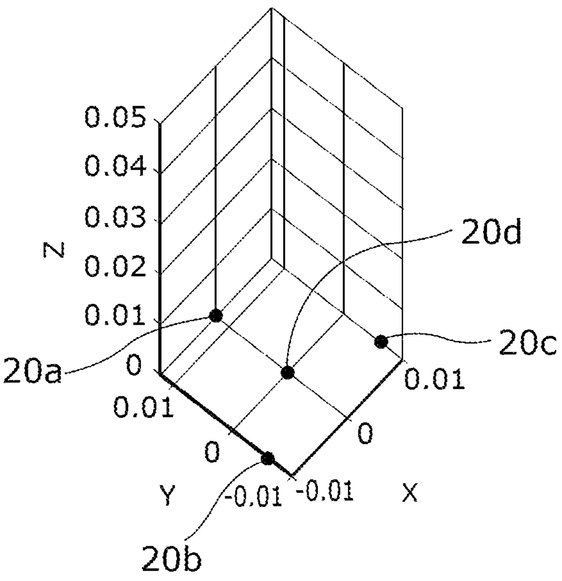
FIG. 5 is a diagram illustrating a planar arrangement example of microphone elements.

As illustrated in FIG. 4, when microphone elements 20*a* to 20*d* are arranged three-dimensionally in a distributed manner, variations of sensitivity characteristics of reference signals are increased as compared to when microphone elements 20*a* to 20*d* are arranged on the same plane. Hereinafter, sensitivity characteristics of reference signals achieved by three-dimensional arrangement example 1 will be described. First, a planar arrangement example, which is to be compared with three-dimensional arrangement example 1, will be described. FIG. 5 is a diagram illustrating the planar arrangement example of microphone elements 20*a* to 20*d*. In FIG. 5, the unit of the numerical values shown on the X-axis, the Y-axis, and the Z-axis is meter.

In the planar arrangement example in FIG. 5, microphone elements 20*a* to 20*d* are located on the XY plane where Z=0. Specifically, the arrangement of microphone elements 20*a* to 20*c* is the same as that in three-dimensional arrangement example 1 but microphone element 20*d* has coordinates of (0, 0, 0). Accordingly, microphone elements 20*a* to 20*d* are arranged on the same plane in the planar arrangement example.

Figure 6:
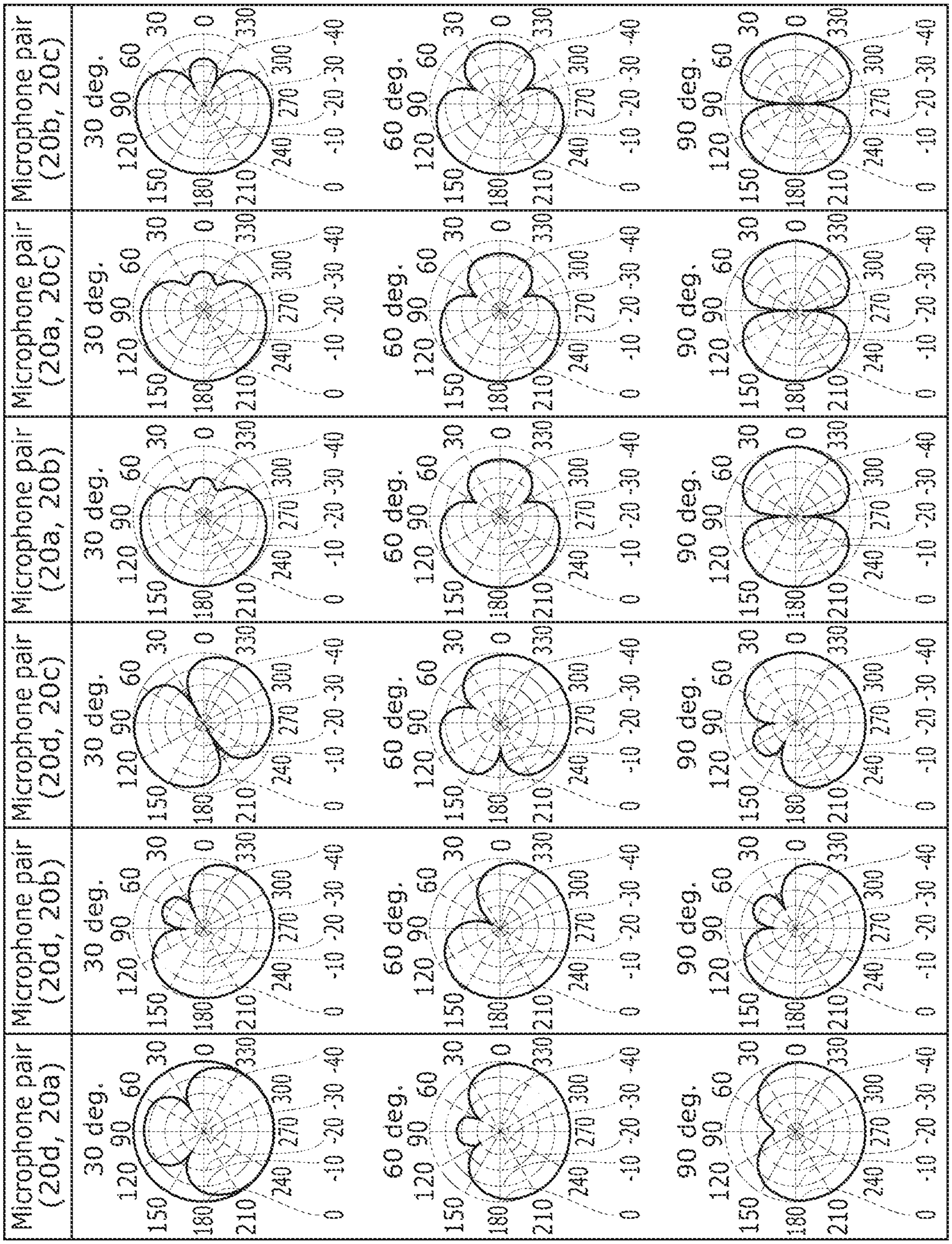
FIG. 6 is a diagram illustrating sensitivity characteristics, in a direction along an XZ plane, of reference signals that are generated by a sound pickup device employing three-dimensional arrangement example 1.
Figure 7:
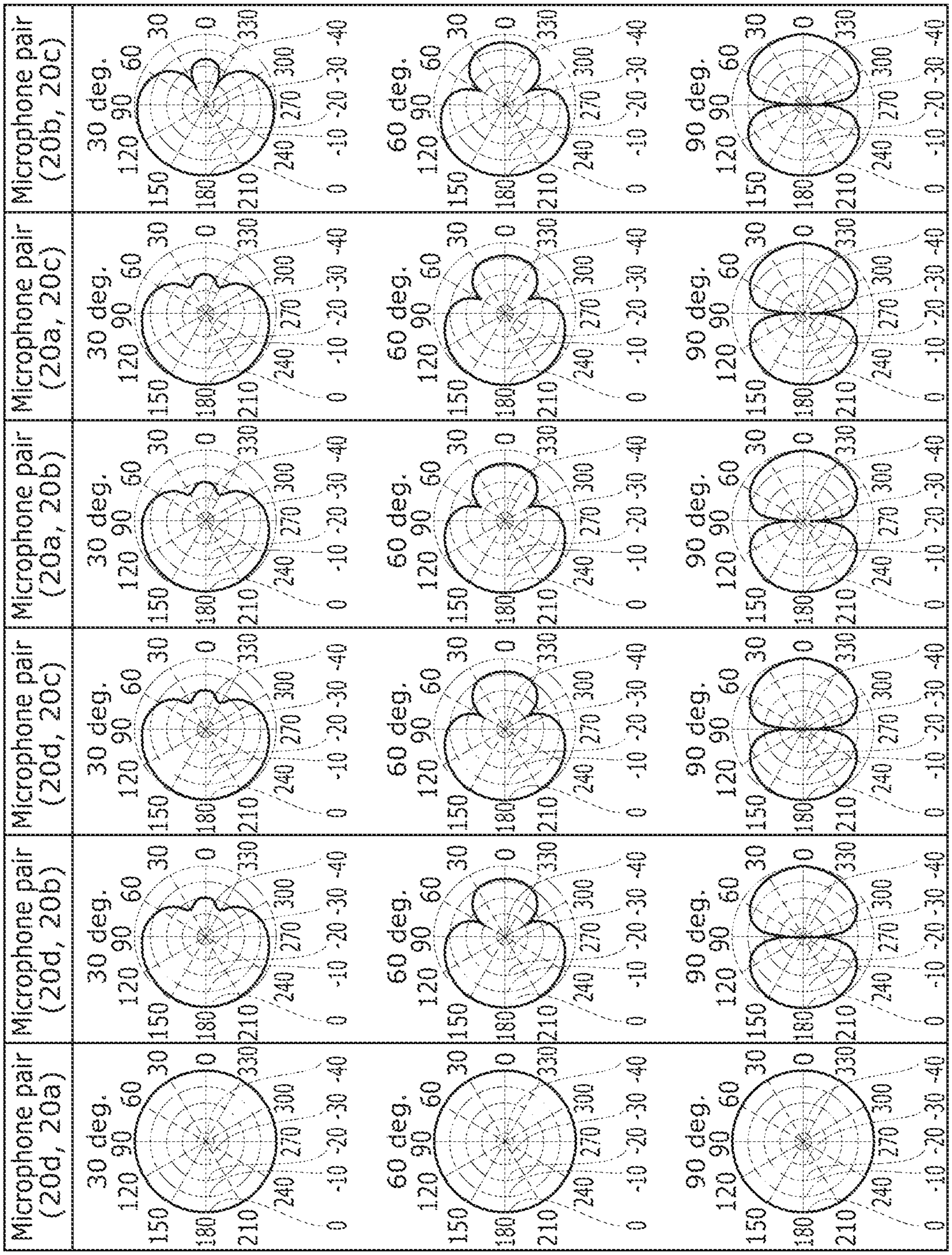
FIG. 7 is a diagram illustrating sensitivity characteristics, in the direction along the XZ plane, of reference signals that are generated by a sound pickup device employing the planar arrangement example.
Figure 8:
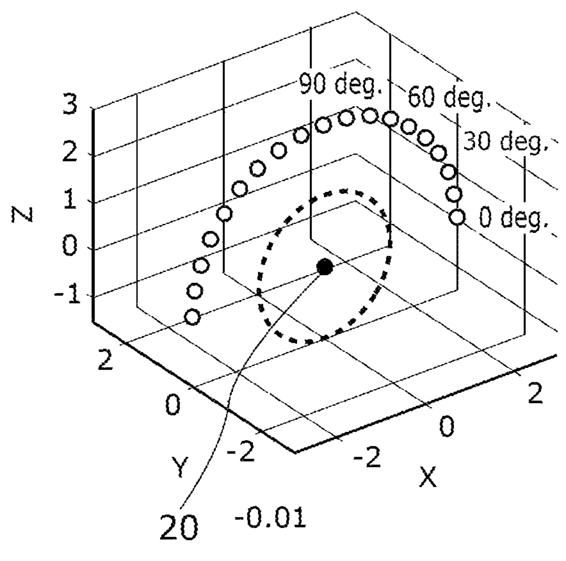
FIG. 8 is a diagram for describing a method for calculating sensitivity characteristics shown in FIG. 6 and FIG. 7.

FIG. 6 is a diagram illustrating sensitivity characteristics, in a direction along the XZ plane, of reference signals that are generated by sound pickup device 10 employing three-dimensional arrangement example 1. FIG. 7 is a diagram illustrating sensitivity characteristics, in the direction along the XZ plane, of reference signals that are generated by sound pickup device 10 employing the planar arrangement example. FIG. 8 is a diagram for describing a method for calculating sensitivity characteristics shown in FIG. 6 and FIG. 7. In FIG. 8, the unit of the numerical values shown on the X-axis, the Y-axis, and the Z-axis is meter.

In each of FIG. 6 and FIG. 7, each of six columns shows sensitivity characteristics of a reference signal generated using a microphone pair. It should be noted that the sensitivity characteristic is, in other words, a directivity pattern.

For example, in each of FIG. 6 and FIG. 7, the leftmost column among the six columns shows sensitivity characteristics of a reference signal (corresponding to reference signal $X_{r3}$ in FIG. 2) that is generated using a microphone pair of microphone element 20*d* and microphone element 20*a*. The second column from the left shows sensitivity characteristics of a reference signal (corresponding to reference signal $X_{r5}$ in FIG. 2) that is generated using a microphone pair of microphone element 20*d* and microphone element 20*b*. The third column from the left shows sensitivity characteristics of a reference signal (corresponding to reference signal $X_{r6}$ in FIG. 2) that is generated using a microphone pair of microphone element 20*d* and microphone element 20*c*.

The fourth column from the left shows sensitivity characteristics of a reference signal (corresponding to reference signal $X_{r1}$ in FIG. 2) that is generated using a microphone pair of microphone element 20*a* and microphone element 20*b*. The fifth column from the left shows sensitivity characteristics of a reference signal (corresponding to reference signal $X_{r2}$ in FIG. 2) that is generated using a microphone pair of microphone element 20*a* and microphone element 20*c*. The sixth column from the left shows sensitivity characteristics of a reference signal (corresponding to reference signal $X_{r4}$ in FIG. 2) that is generated using a microphone pair of microphone element 20*b* and microphone element 20*c*.

Three sensitivity characteristics are illustrated in each of the six columns. The three sensitivity characteristics include a sensitivity characteristic of the reference signal that has a dead angle in a 90° direction, a sensitivity characteristic of the reference signal that has a dead angle in a 60° direction, and a sensitivity characteristic of the reference signal that has a dead angle in a 30° direction. Here, as illustrated by white circles in FIG. 8, the 90° direction is the positive Z-axis direction, and the 60° direction is a direction shifted by 30° from the positive Z-axis direction along the XZ plane. The 30° direction is a direction shifted by 60° from the positive Z-axis direction along the XZ plane. It should be noted that, as illustrated by a broken line in FIG. 8, the sensitivity characteristics shown in FIG. 6 and FIG. 7 are sensitivity characteristics for a sound at a position (illustrated by the broken line in FIG. 8) 1.5 m away from microphone array 20 (a collection of microphone elements 20*a* to 20*d*).

As described above with reference to FIG. 4 and FIG. 5, only the position of microphone element 20*d* is different between three-dimensional arrangement example 1 and the planar arrangement example. Accordingly, as shown in the three columns in the right half of each of FIG. 6 and FIG. 7, sensitivity characteristics achieved by microphone pairs each of which is a different combination of two of microphone elements 20*a* to 20*c* are not different between three-dimensional arrangement example 1 and the planar arrangement example.

In contrast, as shown in the three columns in the left half of each of FIG. 6 and FIG. 7, sensitivity characteristics of microphone pairs each of which includes microphone element 20*d* are more varied in three-dimensional arrangement example 1 (FIG. 6) than in the planar arrangement example (FIG. 7). In other words, when microphone elements 20*a* to 20*d* are arranged three-dimensionally in a distributed manner, variations of sensitivity characteristics of reference signals can be increased as compared to when microphone elements 20*a* to 20*d* are arranged on the same plane. Wide variations of sensitivity characteristics are advantageous for a noise reduction algorithm based on a generalized sidelobe canceller, which is executed by signal processor 30. When variations of sensitivity characteristics of reference signals are increased, sound pickup device 10 can reduce noise from various directions. Accordingly, sound pickup device 10 can effectively reduce sound other than a target sound.

(Frequency Response of Main Signal 1)

Figure 9:
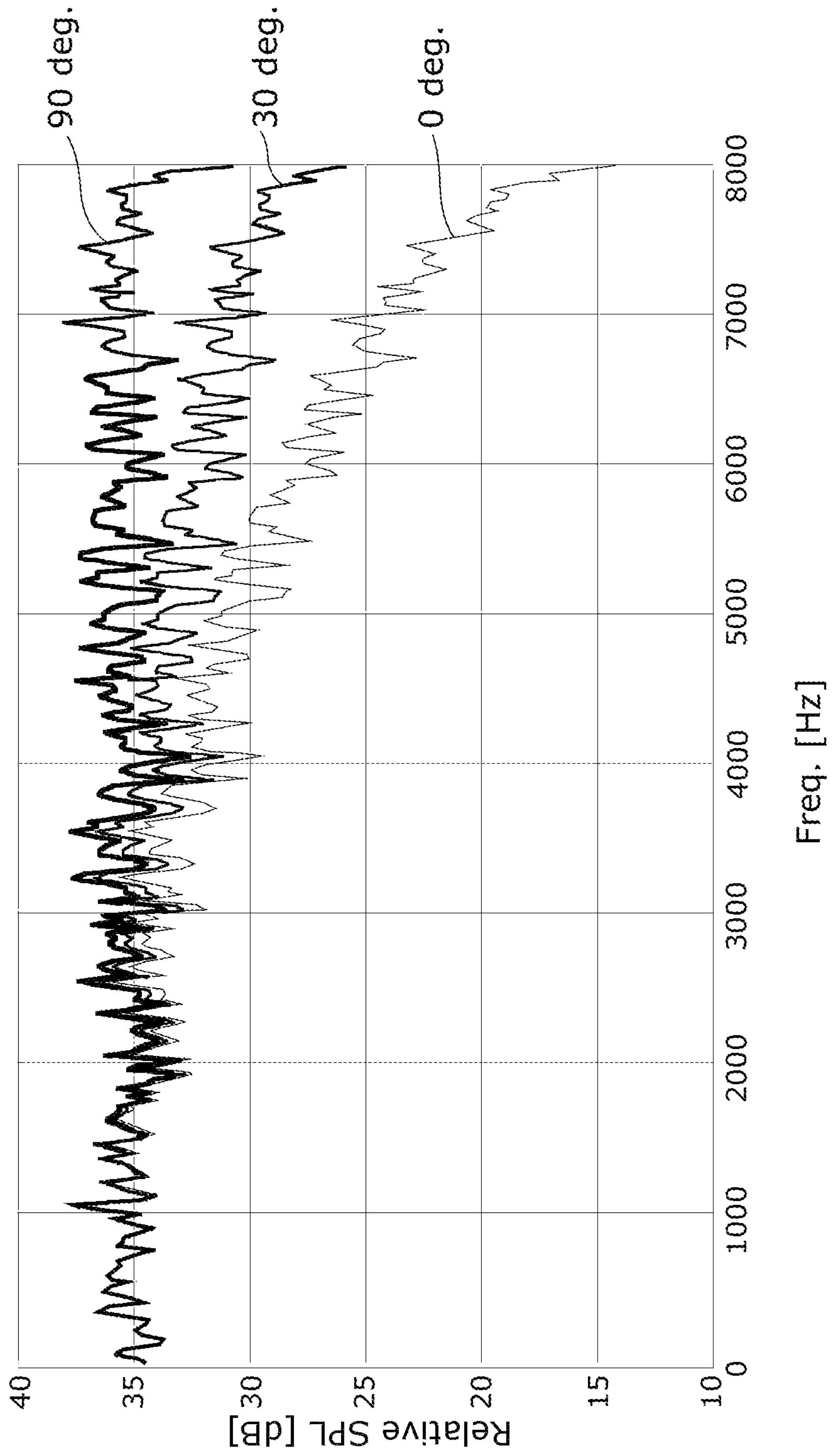
FIG. 9 is a diagram illustrating frequency responses of a main signal that is generated by the sound pickup device employing three-dimensional arrangement example 1 and of which the target sound direction is a 90° direction along the XZ plane.

Next, frequency responses, in a direction along the XZ plane, of a main signal that is generated by sound pickup device 10 employing three-dimensional arrangement example 1 will be described. FIG. 9 is a diagram illustrating frequency responses of a main signal of which the target sound direction is the 90° direction along the XZ plane. In FIG. 9, a frequency response in the 90° direction, a frequency response in the 30° direction, and a frequency response in a 0° direction of the main signal are illustrated, and the target sound direction of the main signal is the 90° direction. In FIG. 9, the vertical axis indicates sound pressure level (SPL) and the horizontal axis indicates frequency.

As illustrated in FIG. 9, in the frequency response in the 90° direction of the main signal of which the target sound direction is the 90° direction, the sound pressure level is generally flat in a frequency band of from 0 to 8 kHz. In contrast, in the frequency response in the 30° direction of the main signal, the sound pressure level is attenuated in a high frequency band. Moreover, in the frequency response in the 0° direction of the main signal, the sound pressure level is further attenuated in the high frequency band than that in the frequency response in the 30° direction of the main signal.

As above, sound pickup device 10 employing three-dimensional arrangement example 1 can generate a main signal having a directivity in a target sound direction (90° direction).

Here, the inventors attempted to improve the directivity of the main signal by adjusting the position of microphone element 20*d* in three-dimensional arrangement example 1. Specifically, the inventors have calculated frequency responses of a main signal in each of three-dimensional arrangement example 2 and three-dimensional arrangement example 3.

Figure 10:
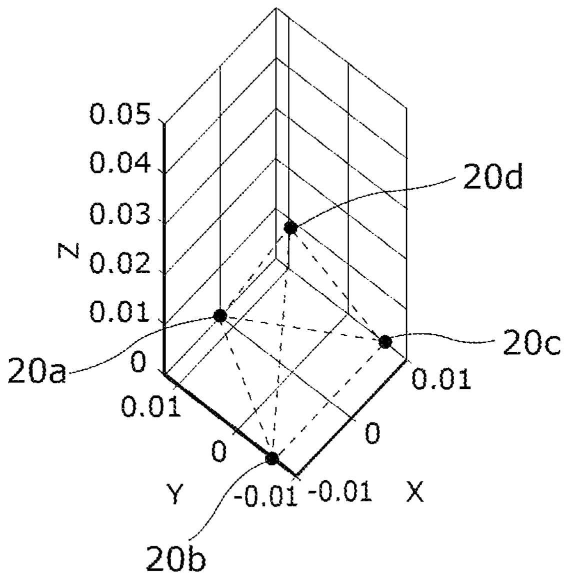
FIG. 10 is a diagram illustrating three-dimensional arrangement example 2 of microphone elements.
Figure 11:
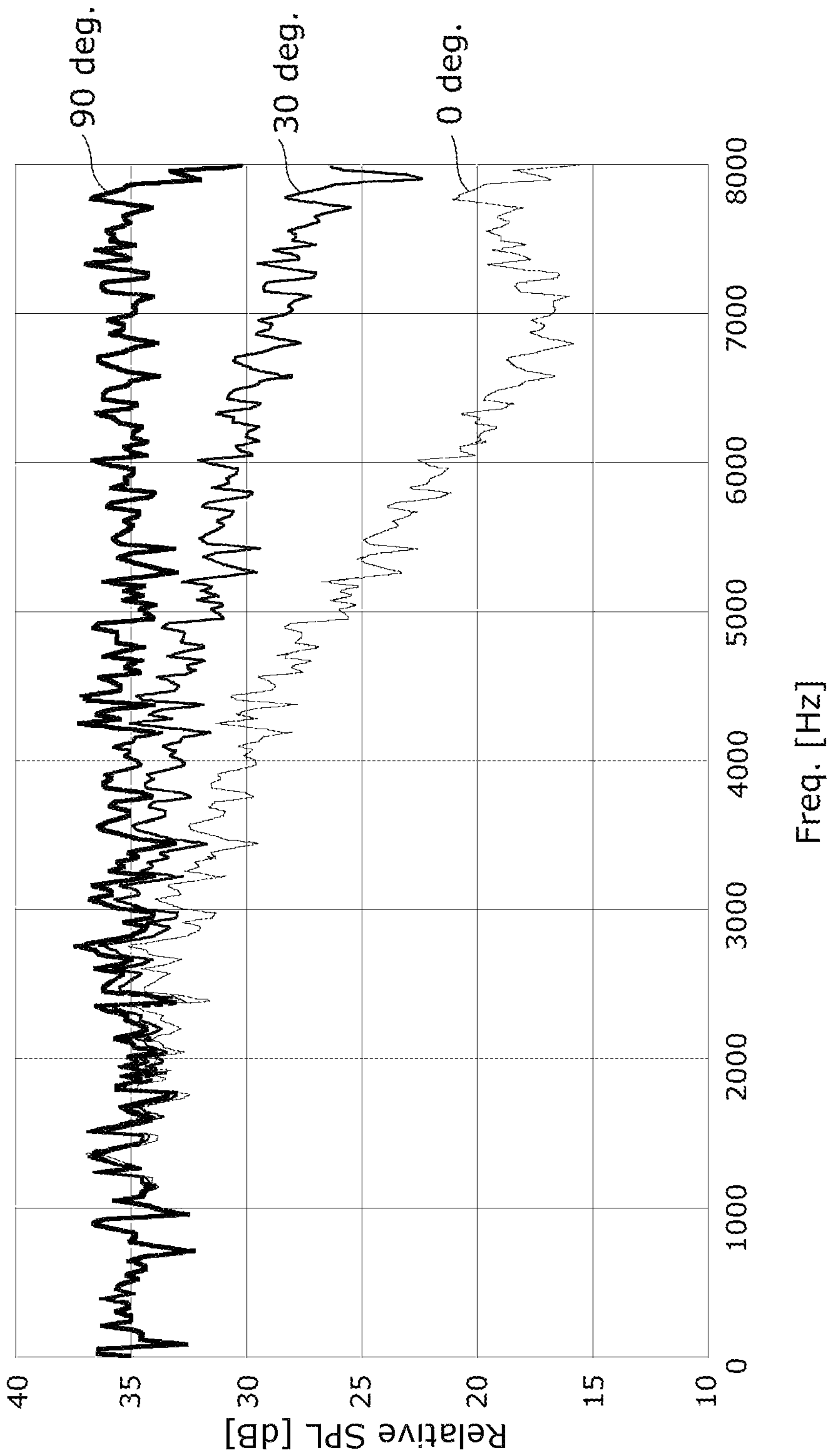
FIG. 11 is a diagram illustrating frequency responses of a main signal that is generated by a sound pickup device employing three-dimensional arrangement example 2 and of which the target sound direction is the 90° direction along the XZ plane.

First, three-dimensional arrangement example 2 will be described. FIG. 10 is a diagram illustrating three-dimensional arrangement example 2 of microphone elements 20*a* to 20*d*. FIG. 11 is a diagram illustrating frequency responses of a main signal that is generated by sound pickup device 10 employing three-dimensional arrangement example 2 and of which the target sound direction is the 90° direction along the XZ plane. In FIG. 11, a frequency response in the 90° direction, a frequency response in the 30° direction, and a frequency response in the 0° direction of the main signal are illustrated, and the target sound direction of the main signal is the 90° direction. In FIG. 11, the vertical axis indicates sound pressure level and the horizontal axis indicates frequency.

In three-dimensional arrangement example 2 in FIG. 10, the arrangement of microphone elements 20*a* to 20*c* is the same as that in three-dimensional arrangement example 1. Microphone element 20*d* is located on the positive side of the Z-axis direction with respect to the position of microphone element 20*d* in three-dimensional arrangement example 1, and the coordinates of microphone element 20*d* are (0, 0, 1.5×Z1). In other words, in three-dimensional arrangement example 2, the position (height) of microphone element 20*d* with respect to the XY plane is 1.5 times higher than that in three-dimensional arrangement example 1. It should be noted that, in three-dimensional arrangement example 2, each of the distance between microphone element 20*d* and microphone element 20*a*, the distance between microphone element 20*d* and 20*b*, and the distance between microphone element 20*d* and 20*c* is approximately 2.9 cm (0.029 in the coordinates in FIG. 10).

In FIG. 11, the main signal is generated by sound pickup device 10 employing three-dimensional arrangement example 2, and the target sound direction of the main signal is the 90° direction. As illustrated in FIG. 11, in the frequency response in the 90° direction of the main signal, the sound pressure level is generally flat in a frequency band of from 0 to 8 kHz. In the frequency response in the 30° direction of the main signal when three-dimensional arrangement example 2 is employed, the sound pressure level is attenuated in a high frequency band; however, the frequency at which the sound pressure level starts to be attenuated is lower than the frequency at which the sound pressure level starts to be attenuated when three-dimensional arrangement example 1 is employed. Similarly, in the frequency response in the 0° direction of the main signal when three-dimensional arrangement example 2 is employed, the sound pressure level is attenuated in the high frequency band; however, the frequency at which the sound pressure level starts to be attenuated is lower than the frequency at which the sound pressure level starts to be attenuated when three-dimensional arrangement example 1 is employed. Accordingly, sound pickup device 10 employing three-dimensional arrangement example 2 can generate a main signal of which the sound pressure level in a direction other than the target sound direction starts to be attenuated at a frequency lower than the frequency at which the sound pressure level starts to be attenuated in three-dimensional arrangement example 1. In other words, sound pickup device 10 employing three-dimensional arrangement example 2 can generate a main signal having a sharp directivity especially in a high frequency band.

Figure 12:
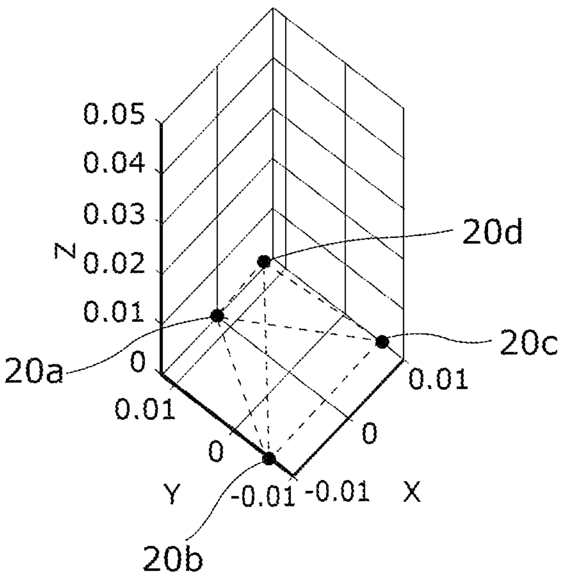
FIG. 12 is a diagram illustrating three-dimensional arrangement example 3 of microphone elements.
Figure 13:
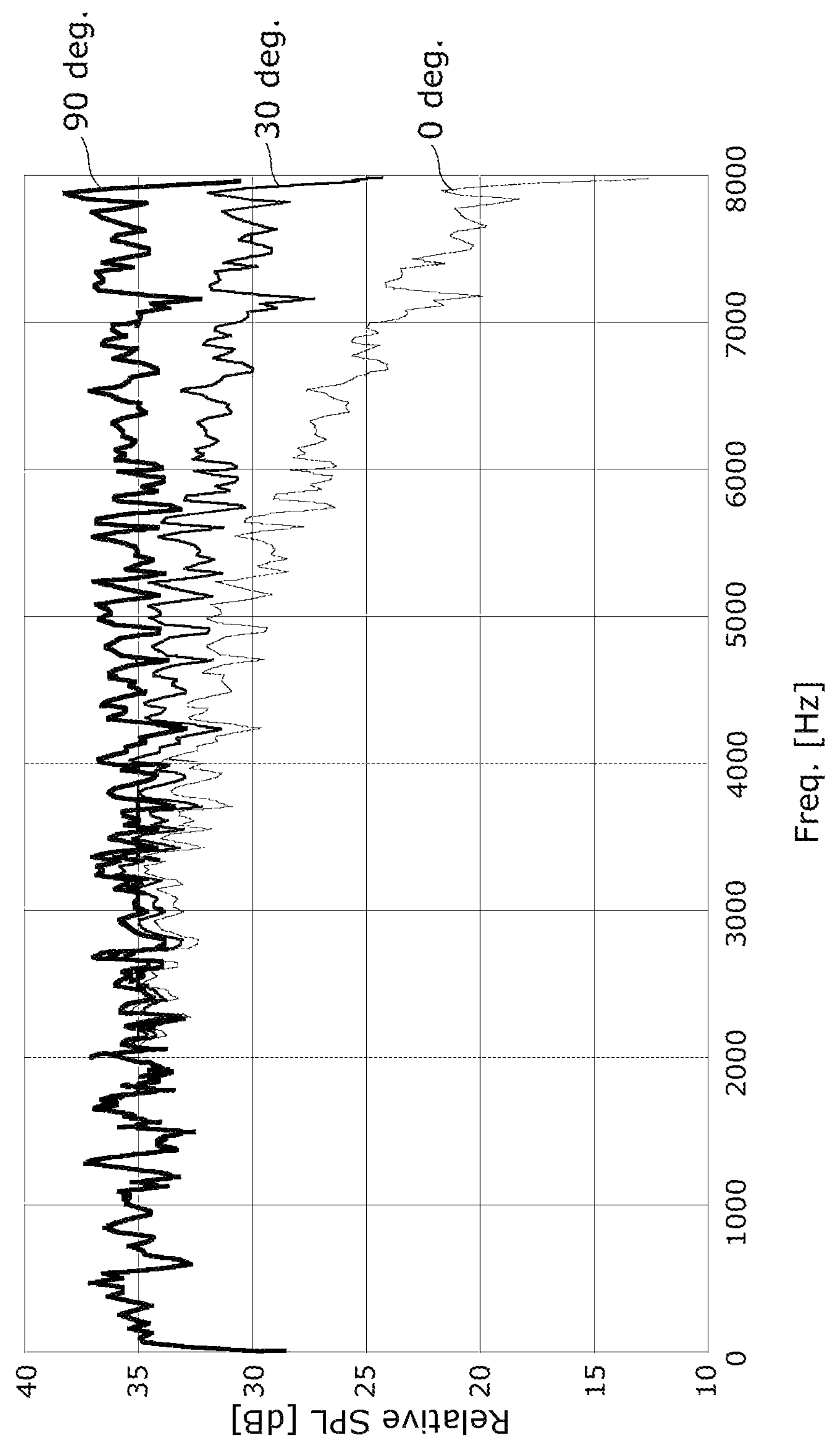
FIG. 13 is a diagram illustrating frequency responses of a main signal that is generated by a sound pickup device employing three-dimensional arrangement example 3 and of which the target sound direction is the 90° direction along the XZ plane.

Next, three-dimensional arrangement example 3 will be described. FIG. 12 is a diagram illustrating three-dimensional arrangement example 3 of microphone elements 20*a* to 20*d*. FIG. 13 is a diagram illustrating frequency responses of a main signal that is generated by sound pickup device 10 employing three-dimensional arrangement example 3 and of which the target sound direction is the 90° direction along the XZ plane. In FIG. 13, a frequency response in the 90° direction, a frequency response in the 30° direction, and a frequency response in the 0° direction of the main signal are illustrated, and the target sound direction of the main signal is the 90° direction. In FIG. 13, the vertical axis indicates sound pressure level and the horizontal axis indicates frequency.

In three-dimensional arrangement example 3 in FIG. 12, the arrangement of microphone elements 20*a* to 20*c* is the same as that in three-dimensional arrangement example 1. Microphone element 20*d* is located on the positive side of the Y-axis direction with respect to the position of microphone element 20*d* in three-dimensional arrangement example 1, and the coordinates of microphone element 20*d* are (0, Y1, Z1). In three-dimensional arrangement example 3, the distance between microphone element 20*d* and microphone element 20*a* is approximately 1.9 cm (0.019 in the coordinates in FIG. 12). In three-dimensional arrangement example 3, each of the distance between microphone element 20*d* and microphone element 20*b* and the distance between microphone element 20*d* and microphone element 20*c* is approximately 2.3 cm (0.023 in the coordinates in FIG. 12).

In FIG. 13, the main signal is generated by sound pickup device 10 employing three-dimensional arrangement example 3, and the target sound direction of the main signal is the 90° direction. As illustrated in FIG. 13, the frequency response in the 90° direction, the frequency response in the 30° direction, and the frequency response in the 0° direction of the main signal are similar to those in three-dimensional arrangement example 1. In other words, sound pickup device 10 employing three-dimensional arrangement example 3 can generate a main signal having a directivity in a target sound direction (90° direction).

(Sensitivity Characteristic of Reference Signal 2)

Figure 14:
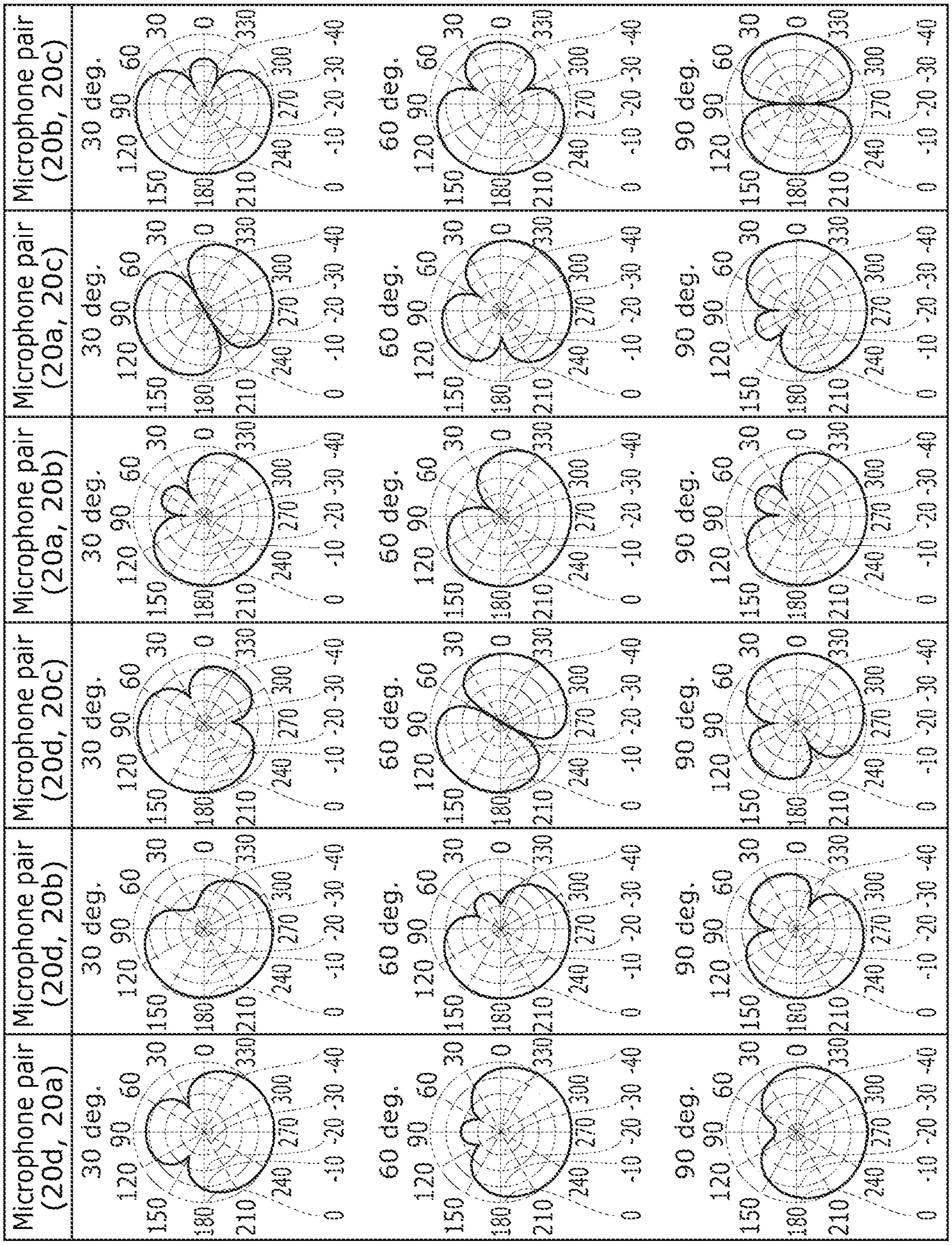
FIG. 14 is a diagram illustrating sensitivity characteristics, in a direction along an XY plane, of reference signals that are generated by the sound pickup device employing three-dimensional arrangement example 1.
Figure 15:
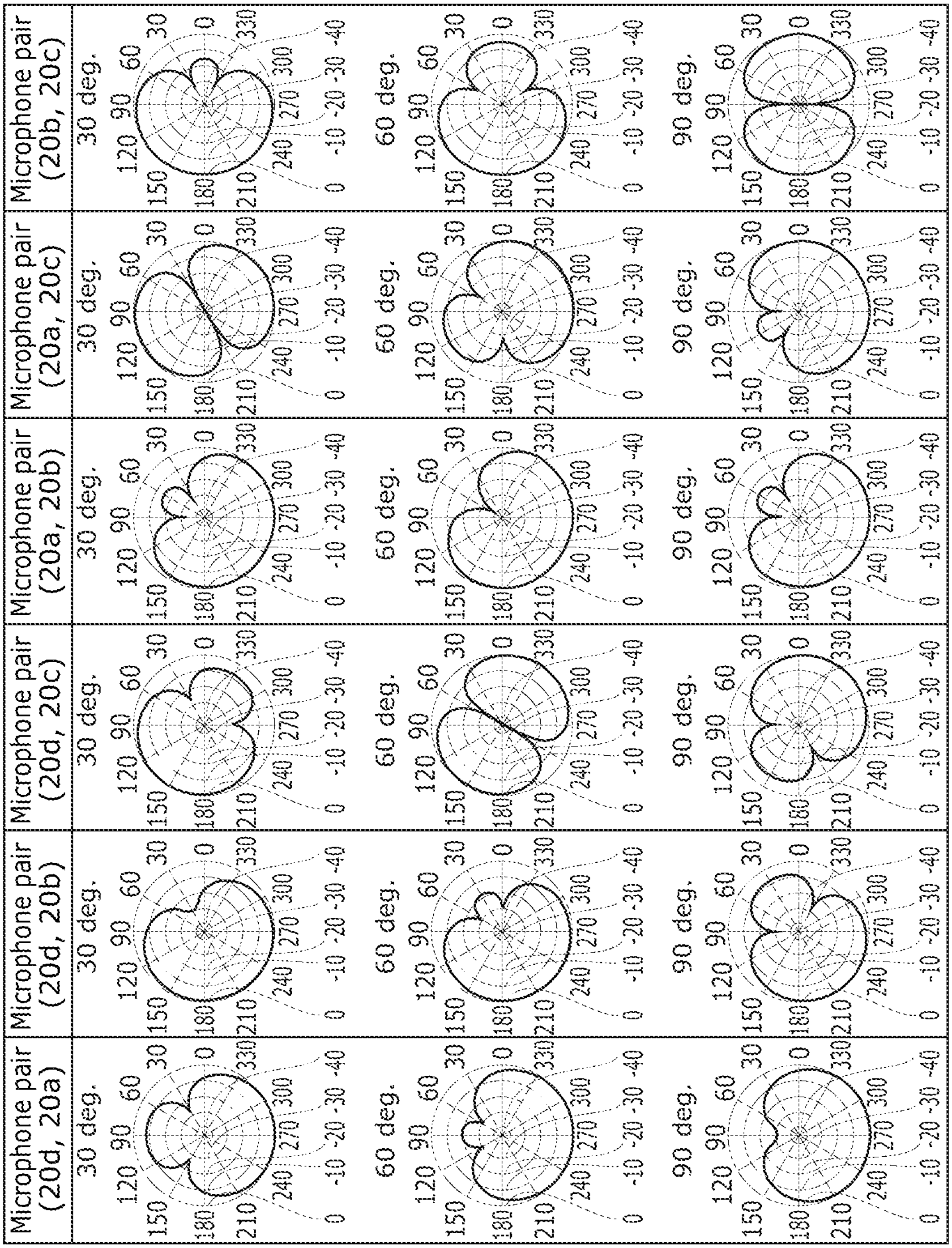
FIG. 15 is a diagram illustrating sensitivity characteristics, in the direction along the XY plane, of reference signals that are generated by the sound pickup device employing the planar arrangement example.
Figure 16:
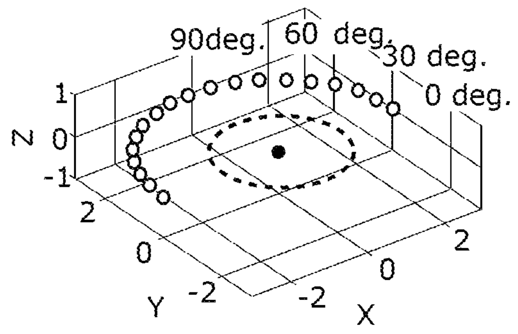
FIG. 16 is a diagram for describing a method for calculating sensitivity characteristics shown in FIG. 14 and FIG. 15.

In FIG. 6 and FIG. 7, sensitivity characteristics in a direction along the XZ plane have been described, whereas sensitivity characteristics in a direction along the XY plane will be described below. FIG. 14 is a diagram illustrating sensitivity characteristics, in the direction along the XY plane, of reference signals that are generated by sound pickup device 10 employing three-dimensional arrangement example 1. FIG. 15 is a diagram illustrating sensitivity characteristics, in the direction along the XY plane, of reference signals that are generated by sound pickup device 10 employing the planar arrangement example. FIG. 16 is a diagram for describing a method for calculating sensitivity characteristics shown in FIG. 14 and FIG. 15. In FIG. 16, the unit of the numerical values shown on the X-axis, the Y-axis, and the Z-axis is meter.

In FIG. 14 and FIG. 15, the sensitivity characteristics of the reference signals are shown in the same format as those in FIG. 6 and FIG. 7. Here, as illustrated by white circles in FIG. 16, a 90° direction is the positive Y-axis direction, and a 60° direction is a direction shifted by 30° from the positive Y-axis direction along the XY plane. A 30° direction is a direction shifted by 60° from the positive Y-axis direction along the XY plane. It should be noted that, as illustrated by a broken line in FIG. 16, the sensitivity characteristics shown in FIG. 14 and FIG. 15 are sensitivity characteristics for a sound at a position (illustrated by the broken line in FIG. 16) 1.5 m away from microphone array 20 (a collection of microphone elements 20*a* to 20*d*).

As described above with reference to FIG. 4 and FIG. 5, only the position of microphone element 20*d* is different between three-dimensional arrangement example 1 and the planar arrangement example. Accordingly, as shown in the three columns in the right half of each of FIG. 14 and FIG. 15, sensitivity characteristics achieved by microphone pairs each of which is a different combination of two of microphone elements 20*a* to 20*c* are not different between three-dimensional arrangement example 1 and the planar arrangement example.

Moreover, as shown in the three columns in the left half of each of FIG. 14 and FIG. 15, sensitivity characteristics of microphone pairs each of which includes microphone element 20*d* are similar between three-dimensional arrangement example 1 and the planar arrangement example. Accordingly, it can be said that even when microphone elements 20*a* to 20*d* are arranged three-dimensionally in a distributed manner, variations of sensitivity characteristics of reference signals are not decreased as compared to when microphone elements 20*a* to 20*d* are arranged on the same plane. In other words, it can be said that when microphone elements 20*a* to 20*d* are arranged three-dimensionally in a distributed manner, performance of microphone elements 20*a* to 20*d* is not deteriorated as compared to when microphone elements 20*a* to 20*d* are arranged on the same plane.

Here, the inventors have checked how sensitivity characteristics of reference signals are changed by adjusting the position of microphone element 20*d* in three-dimensional arrangement example 1. Specifically, the inventors have calculated sensitivity characteristics of reference signals in three-dimensional arrangement example 4 and three-dimensional arrangement example 5 below.

Figure 17:
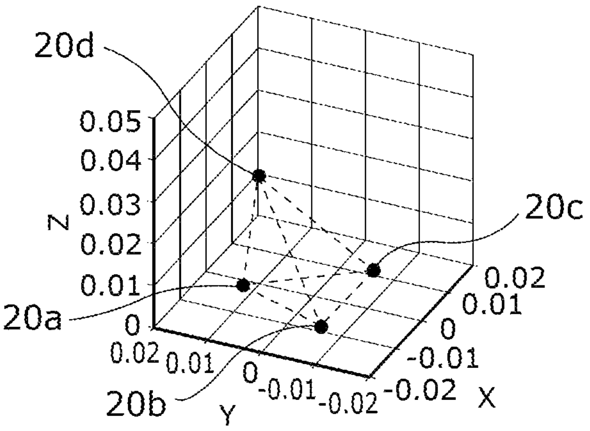
FIG. 17 is a diagram illustrating three-dimensional arrangement example 4 of microphone elements.
Figure 18:
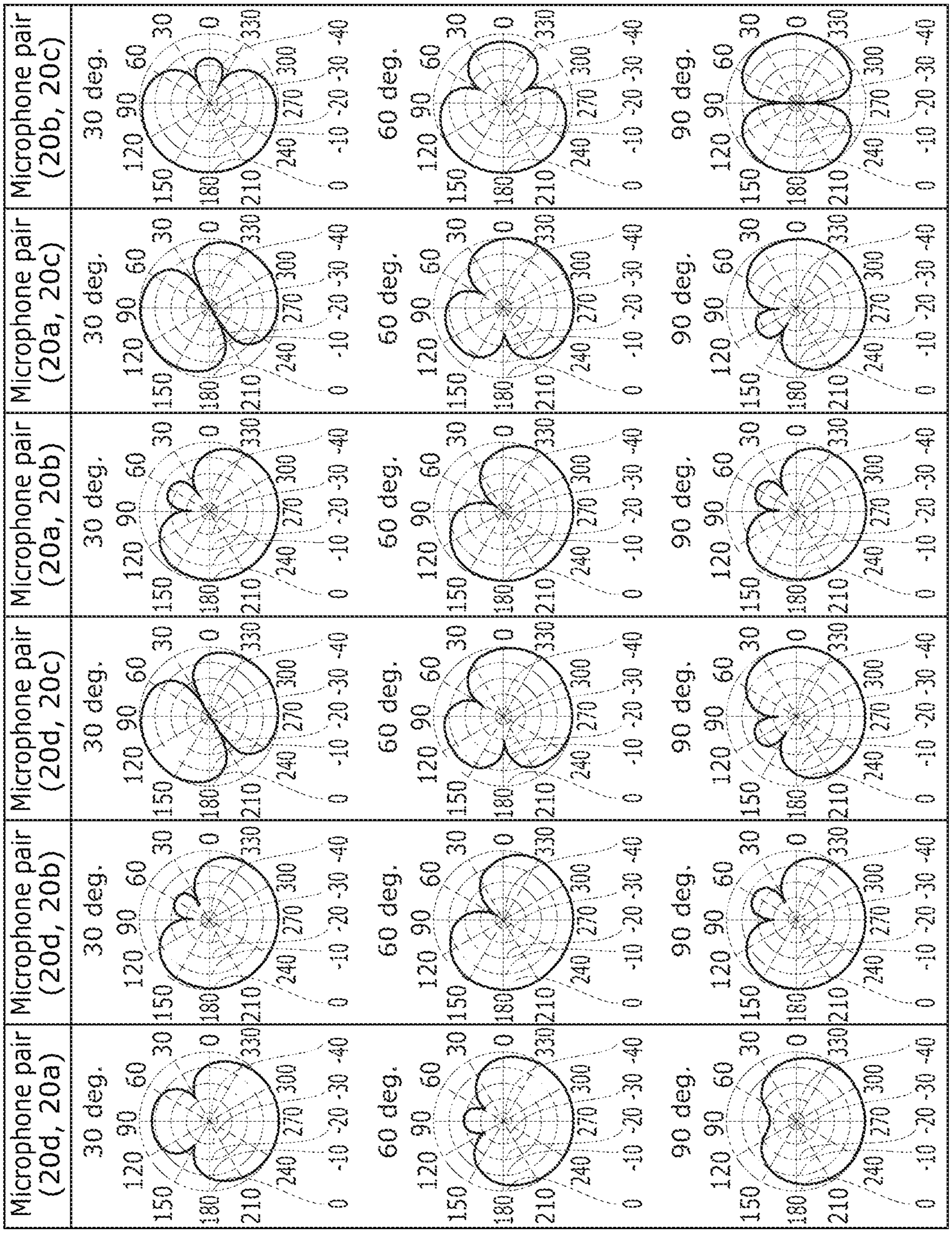
FIG. 18 is a diagram illustrating sensitivity characteristics, in the direction along the XY plane, of reference signals that are generated by a sound pickup device employing three-dimensional arrangement example 4.

First, three-dimensional arrangement example 4 will be described. FIG. 17 is a diagram illustrating three-dimensional arrangement example 4 of microphone elements 20*a* to 20*d*. FIG. 18 is a diagram illustrating sensitivity characteristics, in the direction along the XY plane, of reference signals that are generated by sound pickup device 10 employing three-dimensional arrangement example 4.

In three-dimensional arrangement example 4 in FIG. 17, the arrangement of microphone elements 20*a* to 20*c* is the same as that in three-dimensional arrangement example 1. The position of microphone element 20*d* is shifted in both the Y-axis direction and the Z-axis direction from the position of microphone element 20*d* in three-dimensional arrangement example 1. It should be noted that, the position of microphone element 20*d* does not overlap with any positions of microphone elements 20*a* to 20*c*, as viewed from the Z-axis direction. In other words, microphone element 20*d* is not located directly above any of microphone elements 20*a* to 20*c*.

Only the position of microphone element 20*d* is different between three-dimensional arrangement example 1 and three-dimensional arrangement example 4. Accordingly, as shown in the three columns in the right half of each of FIG. 14 and FIG. 18, sensitivity characteristics achieved by microphone pairs each of which is a different combination of two of microphone elements 20*a* to 20*c* are not different between three-dimensional arrangement example 1 and three-dimensional arrangement example 4.

In contrast, as shown in the three columns in the left half of each of FIG. 14 and FIG. 18, sensitivity characteristics of microphone pairs each of which includes microphone element 20*d* are significantly different between three-dimensional arrangement example 1 and three-dimensional arrangement example 4. In other words, variations of sensitivity characteristics of reference signals can be differentiated by changing the position of microphone element 20*d*.

Figure 19:
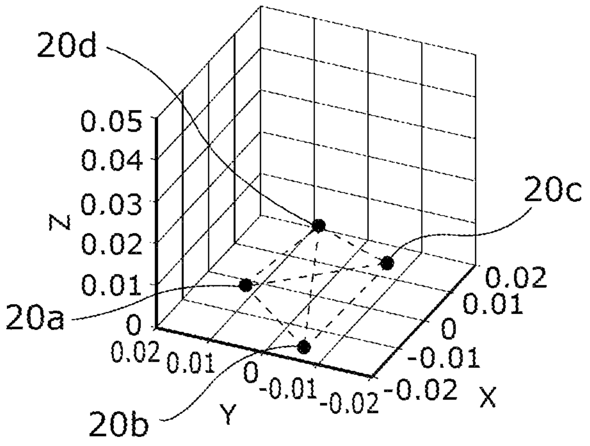
FIG. 19 is a diagram illustrating three-dimensional arrangement example 5 of microphone elements.

Next, three-dimensional arrangement example 5 will be described. FIG. 19 is a diagram illustrating three-dimensional arrangement example 5 of microphone elements 20*a* to 20*d*. FIG. is a diagram illustrating sensitivity characteristics, in the direction along the XY plane, of reference signals that are generated by sound pickup device 10 employing three-dimensional arrangement example 5.

In three-dimensional arrangement example 5 in FIG. 19, the arrangement of microphone elements 20*a* and 20*d* is the same as that in three-dimensional arrangement example 1. In three-dimensional arrangement example 5, a space between microphone element 20*b* and microphone element 20*c* is wider than that in three-dimensional arrangement example 1. Specifically, microphone element 20*b* is located on the negative side of the X-axis direction with respect to the position of microphone element 20*b* in three-dimensional arrangement example 1, and microphone element 20*c* is located on the positive side of the X-axis direction with respect to the position of microphone element 20*c* in three-dimensional arrangement example 1.

The positions of microphone elements 20*b* and 20*c* are different between three-dimensional arrangement example 1 and three-dimensional arrangement example 5. Accordingly, as shown in the leftmost column in each of FIG. 14 and FIG. 20, sensitivity characteristics achieved by a microphone pair which is a combination of microphone element 20*a* and microphone element 20*d* are not different between three-dimensional arrangement example 1 and three-dimensional arrangement example 5.

Figure 20:
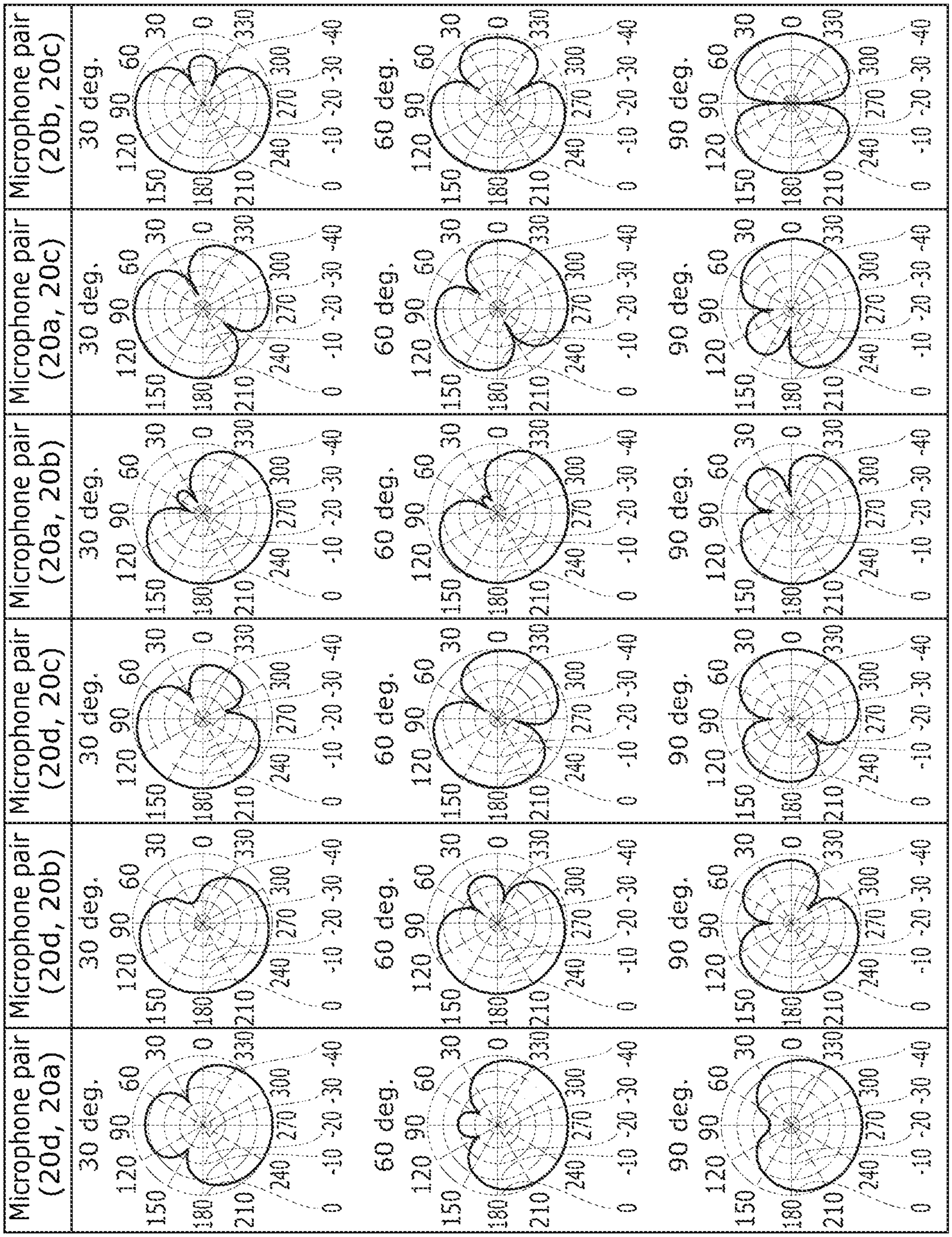
FIG. 20 is a diagram illustrating sensitivity characteristics, in the direction along the XY plane, of reference signals that are generated by a sound pickup device employing three-dimensional arrangement example 5.

In contrast, as shown in the five columns except for the leftmost column in each of FIG. 14 and FIG. 20, sensitivity characteristics of microphone pairs each of which includes at least microphone element 20*b* or microphone element 20*c* are different between three-dimensional arrangement example 1 and three-dimensional arrangement example 5. Accordingly, variations of sensitivity characteristics of reference signals can be differentiated by changing the positions of microphone elements 20*b* and 20*c*.

(Frequency Response of Main Signal 2)

Figure 21:
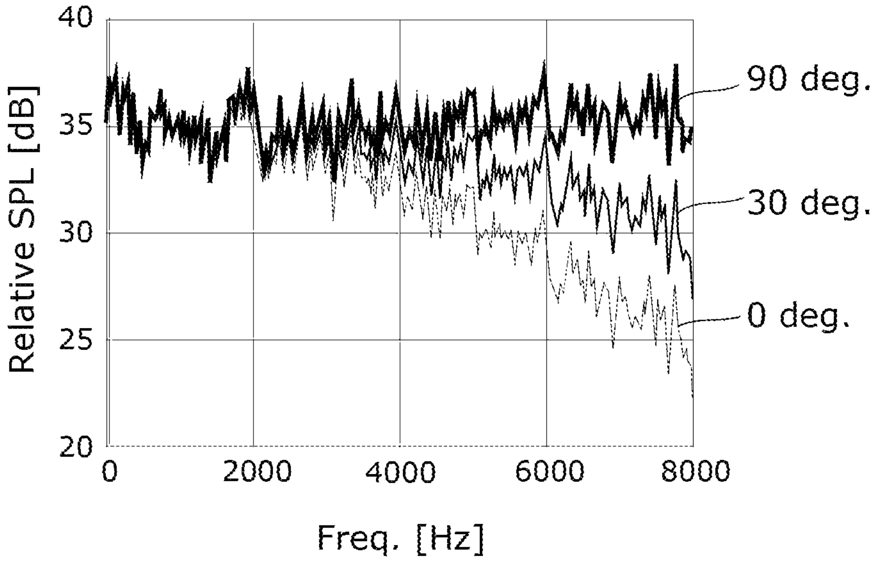
FIG. 21 is a diagram illustrating frequency responses of a main signal that is generated by the sound pickup device employing the planar arrangement example and of which the target sound direction is a 90° direction along the XY plane.
Figure 22:
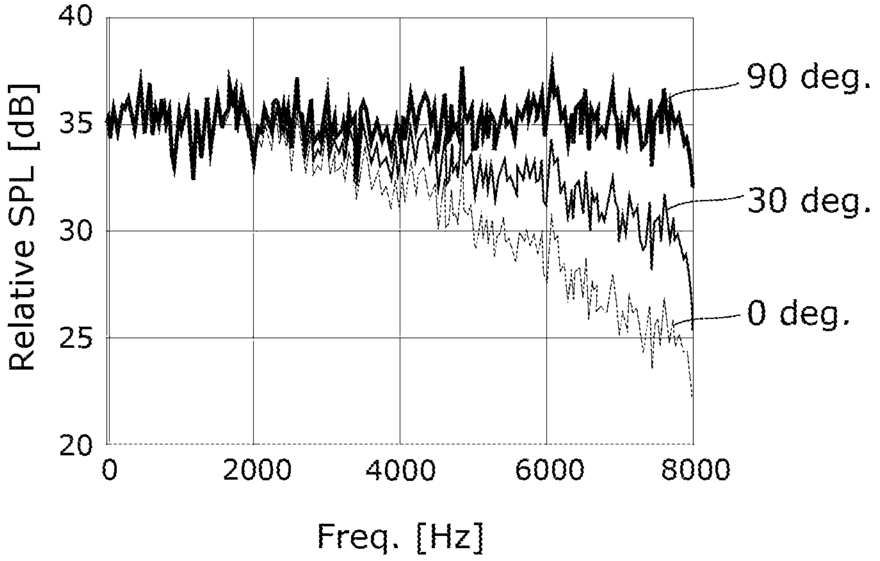
FIG. 22 is a diagram illustrating frequency responses of a main signal that is generated by the sound pickup device employing three-dimensional arrangement example 1 and of which the target sound direction is the 90° direction along the XY plane.
Figure 23:
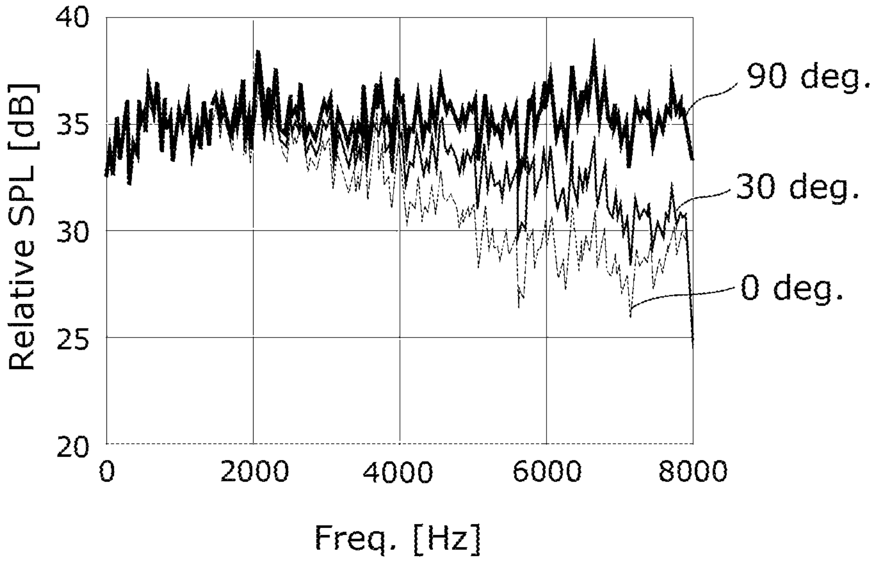
FIG. 23 is a diagram illustrating frequency responses of a main signal that is generated by the sound pickup device employing three-dimensional arrangement example 4 and of which the target sound direction is the 90° direction along the XY plane.
Figure 24:
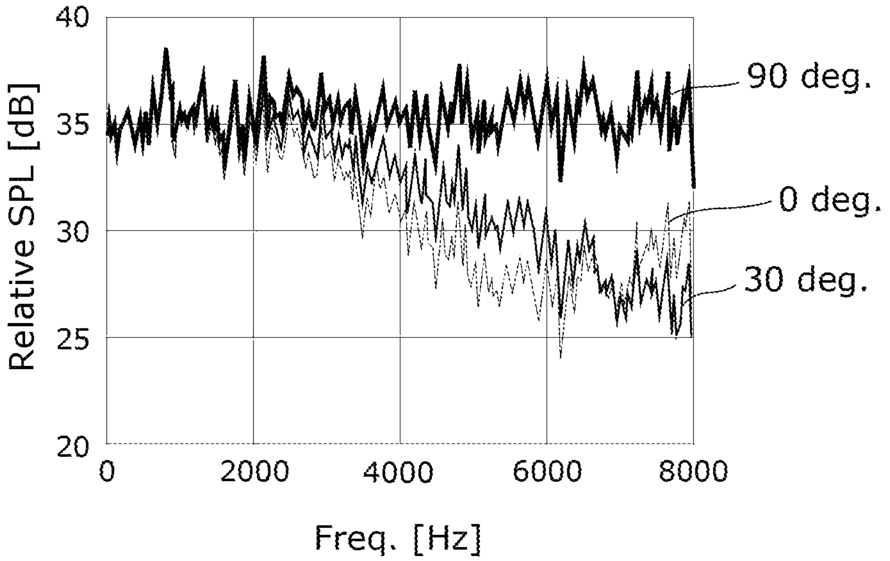
FIG. 24 is a diagram illustrating frequency responses of a main signal that is generated by the sound pickup device employing three-dimensional arrangement example 5 and of which the target sound direction is the 90° direction along the XY plane.

Next, frequency responses, in the direction along the XY plane, of main signals that are each generated by sound pickup device 10 employing one of the planar arrangement example, three-dimensional arrangement example 1, three-dimensional arrangement example 4, and three-dimensional arrangement example 5 will be described. FIG. 21 is a diagram illustrating frequency responses of a main signal that is generated by sound pickup device 10 employing the planar arrangement example and of which the target sound direction is the 90° direction along the XY plane. FIG. 22 is a diagram illustrating frequency responses of a main signal that is generated by sound pickup device 10 employing three-dimensional arrangement example 1 and of which the target sound direction is the 90° direction along the XY plane. FIG. 23 is a diagram illustrating frequency responses of a main signal that is generated by sound pickup device 10 employing three-dimensional arrangement example 4 and of which the target sound direction is the 90° direction along the XY plane. FIG. 24 is a diagram illustrating frequency responses of a main signal that is generated by sound pickup device 10 employing three-dimensional arrangement example 5 and of which the target sound direction is the 90° direction along the XY plane.

In each of FIG. 21 to FIG. 24, a frequency response in the 90° direction, a frequency response in the 30° direction, and a frequency response in the 0° direction of the main signal are illustrated, and the target sound direction of the main signal is the 90° direction. In each of FIG. 21 to FIG. 24, the vertical axis indicates sound pressure level and the horizontal axis indicates frequency.

In comparison between FIG. 21 (planar arrangement example) and FIG. 22 (three-dimensional arrangement example 1), it can be said that the frequency response in the 90° direction, the frequency response in the 30° direction, and the frequency response in the 0° direction of the main signal when three-dimensional arrangement example 1 is employed are similar to those when the planar arrangement example is employed.

In comparison between FIG. 22 (three-dimensional arrangement example 1) and FIG. 23 (three-dimensional arrangement example 4), it can be said that the frequency response in the 90° direction and the frequency response in the 30° direction of the main signal when three-dimensional arrangement example 4 is employed are similar to those when three-dimensional arrangement example 1 is employed. In contrast, a reduction amount of the sound pressure level in the 0° direction at a frequency band of 7 kHz or more when three-dimensional arrangement example 4 is employed is decreased as compared to when three-dimensional arrangement example 1 is employed.

In comparison between FIG. 22 (three-dimensional arrangement example 1) and FIG. 24 (three-dimensional arrangement example 5), it can be said that the frequency response in the 90° direction of the main signal when three-dimensional arrangement example 5 is employed is similar to that when three-dimensional arrangement example 1 is employed.

In contrast, a reduction amount of the sound pressure level in the 30° direction at a frequency band of 4 kHz or more when three-dimensional arrangement example 5 is employed is increased as compared to when three-dimensional arrangement example 1 is employed. However, although a reduction amount of the sound pressure level in the 0° direction at a frequency band of from 4 kHz to 5 kHz when three-dimensional arrangement example 5 is employed is increased as compared to when three-dimensional arrangement example 1 is employed, a reduction amount of the sound pressure level in the 0° direction at a frequency band of 7 kHz or more when three-dimensional arrangement example 5 is employed is decreased as compared to when three-dimensional arrangement example 1 is employed.

Thus, sound pickup device 10 employing any of three-dimensional arrangement example 1, three-dimensional arrangement example 4, and three-dimensional arrangement example 5 can generate a main signal having a directivity in a target sound direction (90° direction).

(Summary of Three-Dimensional Arrangement)

In each of three-dimensional arrangement examples 1 to 5, any one of straight lines each of which connects two microphone elements of a different one of effective microphone pairs is not parallel to any other of the straight lines. When explained with vectors, $vi=t\cdot vj$ (t is a real number) is not established, where vi and vj (i and j each being a natural number) represent any two of vectors of straight lines each of which connects two microphone elements of a different one of the effective microphone pairs.

Specifically, in each of three-dimensional arrangement examples 1 to 5, the positions of microphone elements 20*a* to 20*d* correspond to the positions of the vertices of a tetrahedron (triangular pyramid), and six sides of the tetrahedron corresponding to straight lines (line segments) each of which connects two microphone elements of a different one of the effective microphone pairs (straight lines L1 to L6 in three-dimensional arrangement example 1) are not parallel to one another. In such sound pickup device 10 employing any of three-dimensional arrangement examples 1 to 5, variations of sensitivity characteristics of reference signals are increased.

It should be noted that, in each of three-dimensional arrangement examples 1 to 5, microphone elements 20*a* to 20*d* include three microphone elements 20*a* to 20*c* that are located on the same plane and one microphone element 20*d* that is not located on the same plane, and three microphone elements 20*a* to 20*c* are arranged to form a triangle on the same plane.

Moreover, in each of three-dimensional arrangement examples 2 to 5, one of distances each of which is the distance between two microphone elements of a different one of the effective microphone pairs is different from at least another one of the distances. In other words, in each of three-dimensional arrangement examples 2 to 5, distances between microphone elements are partially irregular. Thus, the directivity of a main signal can be made sharp. According to the consideration by the inventors, the directivity of a main signal can be made sharp in both a low frequency band and a high frequency band by making a distance between any two microphone elements longer.

(Variations of Three-Dimensional Arrangement)

Here, a three-dimensional arrangement employed in sound pickup device 10 is not limited to three-dimensional arrangement examples 1 to 5. For example, four or more microphone elements included in sound pickup device 10 may include n (n being a natural number greater than or equal to 3) microphone elements that are located on the same plane and one or more microphone elements that are not located on the same plane. For example, microphone elements may be arranged at the vertices of a pyramid whose base is an n-sided polygon.

Figure 25:
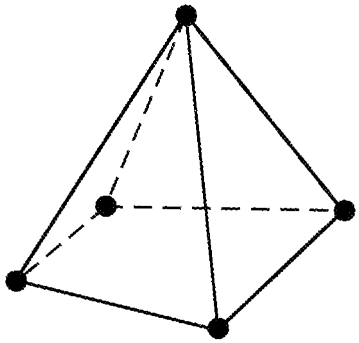
FIG. 25 is a diagram illustrating an example where microphone elements are arranged at the vertices of a quadrangular pyramid.

In this case, the base may be a regular n-sided polygon (n being an odd number) or may be a polygon whose n sides are not parallel to one another. FIG. 25 is a diagram illustrating an example where microphone elements are arranged at the vertices of a quadrangular pyramid whose base is a quadrangle having four sides that are not parallel to one another. In FIG. 25, the positions of microphone elements are indicated by black circles.

Figure 26:
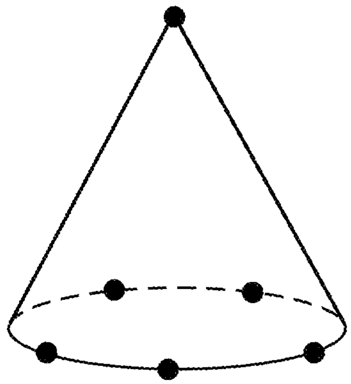
FIG. 26 is a diagram illustrating an example where microphone elements are arranged at the apex and the circumference of the bottom of a cone.

Moreover, microphone elements may be arranged at the apex and the circumference of the bottom of a cone. FIG. 26 is a diagram illustrating an example where microphone elements are arranged at the apex and the circumference of the bottom of a cone. In FIG. 26, the positions of microphone elements are indicated by black circles. It should be noted that the bottom of the cone may be either a perfect circle or an ellipse.

Moreover, microphone elements may be arranged spirally. Microphone elements may be arranged in any way in a range satisfying the condition that any one of straight lines each of which connects two microphone elements of a different one of effective microphone pairs is not parallel to any other of the straight lines.

(Advantageous Effects, Etc.)

As described above, sound pickup device 10 includes microphone elements 20*a* to 20*d* arranged three-dimensionally in a distributed manner. Among microphone pairs each of which is a different combination of two microphone elements of microphone elements 20*a* to 20*d*, a total number of effective microphone pairs is greater than a total number of microphone elements 20*a* to 20*d*, the effective microphone pairs each being a combination of two microphone elements having a distance less than a distance D between each other.

Distance D is represented by D=c/2f, where f represents a frequency of a target sound obtained from microphone elements 20*a* to 20*d* and *c* represents a velocity of the target sound. Any one of straight lines each of which connects two microphone elements of a different one of the effective microphone pairs is not parallel to any other of the straight lines.

Accordingly, variations of sensitivity characteristics of reference signals are increased, and thus sound pickup device 10 can reduce noise from various directions. In other words, sound pickup device 10 can effectively reduce sound other than a target sound.

Moreover, for example, microphone elements 20*a* to 20*d* include n (n being a natural number greater than or equal to 3) microphone elements that are arranged on a same plane and one or more microphone elements that are not arranged on the same plane.

Accordingly, variations of sensitivity characteristics of reference signals can be increased by employing an arrangement in which microphone elements 20*a* to 20*d* are arranged to form an n-sided pyramid (pyramid whose bottom is an n-sided polygon).

Moreover, for example, the n microphone elements are arranged to form a regular n-sided polygon on the same plane.

Accordingly, variations of sensitivity characteristics of reference signals can be increased by employing an arrangement in which microphone elements 20*a* to 20*d* are arranged to form a pyramid whose bottom is a regular n-sided polygon.

Moreover, for example, one of distances each of which is the distance between the two microphone elements of a different one of the effective microphone pairs is different from at least another one of the distances.

Accordingly, the directivity of a main signal can be made sharp.

Moreover, for example, the total number of the microphone pairs obtainable from microphone elements 20*a* to 20*d* is equal to the total number of the effective microphone pairs.

Accordingly, sound pickup device 10 can effectively reduce sound other than a target sound since all microphone pairs function as effective microphone pairs.

Moreover, for example, sound pickup device 10 further includes: delayers 31*a* to 31*d* that delay sound signals obtained from microphone elements 20*a* to 20*d*, respectively; main signal generator 31 that generates main signal $X_m$ by adding up output signals from delayers 31*a* to 31*d*; reference signal generators 32*a* to 32*f* that generate reference signals $X_{r1}$ to $X_{r6}$, respectively, by performing subtraction between each pair of output signals corresponding to combinations of two microphone elements of the effective microphone pairs, among the output signals from delayers 31*a* to 31*d*; adaptive filters 33*a* to 33*f* that apply filter coefficients to reference signals $X_{r1}$ to $X_{r6}$, respectively; subtractor 34 that subtracts, from main signal $X_m$ generated, reference signals $X_{r1}$ to $X_{r6}$ to which the filter coefficients have been applied; and coefficient updater 35 that updates the filter coefficients, based on output signal Y obtained by the subtraction by subtractor 34.

Delayers 31*a* to 31*d* are an example of a delayer. Main signal $X_m$ is an example of a first signal, and is a signal that is generated by adding up sound signals (output signals from delayers 31*a* to 31*d*) that have been obtained from microphone elements 20*a* to 20*d* and delayed by delayers 31*a* to 31*d*, respectively, according to a target sound direction. Each of reference signals $X_{r1}$ to $X_{r6}$ is an example of a second signal, and a signal that is generated by performing subtraction between two sound signals (among output signals from delayers 31*a* to 31*d*) that have been obtained from two microphone elements of a corresponding one of the effective microphone pairs and delayed by corresponding two of delayers 31*a* to 31*d* according to the target sound direction. Main signal generator 31 is an example of a first signal generator, each of reference signal generators 32*a* to 32*f* is an example of a second signal generator, and output signal Y is an example of a third signal.

Accordingly, sound pickup device 10 can perform beamforming based on sound signals obtained from microphone elements 20*a* to 20*d*.

OTHER EMBODIMENTS

Although the embodiment has been described thus far, the present disclosure is not limited to the embodiment.

For example, the shape or the like of the sound pickup device described in the embodiment is an example, and the sound pickup device may be in the shape of cuboid or other shape.

Moreover, the configuration of the signal processor according to the embodiment is an example. For example, the signal processor may include a D/A converter, a low pass filter (LPF), a high pass filter (HPF), a power amplifier, or an A/D converter, as a constituent element. Moreover, although signal processing performed by the signal processor is digital signal processing for example, part of the signal processing may be analog signal processing.

Furthermore, in the embodiment, the signal processor may be configured of dedicated hardware, or may be implemented by executing a software program suitable for the signal processor. The signal processor may be implemented by a program executor, such as a CPU or a processor, retrieving and executing a software program stored in a storage medium, such as a hard disk drive or a semiconductor memory device.

Moreover, the signal processor may be circuits (or an integrated circuit). These circuits may be configured as a single circuit or may be individual circuits. Moreover, these circuits may be ordinary circuits or specialized circuits.

Furthermore, although the signal processor is implemented as hardware (circuit) in the embodiment, part or all of the signal processor may be implemented by executing a software program suitable for the signal processor. The signal processor may be implemented by a program executor, such as a CPU or a processor, retrieving and executing a software program stored in a storage medium, such as a hard disk drive or a semiconductor memory device.

Additionally, forms obtained by making various modifications to the embodiment that can be conceived by a person skilled in the art, as well as other forms realized by arbitrarily combining some constituent elements and functions in the embodiment, without departing from the essence of the present disclosure, are included in the scope of the present disclosure. For example, the present disclosure may be implemented as a system including a sound pickup device according to the embodiment.

INDUSTRIAL APPLICABILITY

A sound pickup device according to the present disclosure is applicable as a sound pickup device used in a teleconference system or the like.

The invention claimed is:

1. A sound pickup device comprising:

a plurality of microphone elements that are arranged three-dimensionally in a distributed manner, wherein among microphone pairs each of which is a different combination of two microphone elements of the plurality of microphone elements, a total number of effective microphone pairs is greater than a total number of the plurality of microphone elements, the effective microphone pairs each being a combination of two microphone elements having a distance less than a distance D between each other, the distance D is represented by D=c/2f, where f represents a frequency of a target sound obtained from the plurality of microphone elements and c represents a velocity of the target sound, any one of straight lines each of which connects the two microphone elements of a different one of the effective microphone pairs is not parallel to any other of the straight lines, and the plurality of microphone elements include n microphone elements that are located on a same plane and one or more microphone elements that are not located on the same plane, n being a natural number greater than or equal to 3.

2. The sound pickup device according to claim 1, wherein the n microphone elements are arranged to form a regular n-sided polygon on the same plane.

3. The sound pickup device according to claim 1, wherein one of distances each of which is the distance between the two microphone elements of a different one of the effective microphone pairs is different from at least another one of the distances.

4. The sound pickup device according to claim 1, wherein a total number of the microphone pairs obtainable from the plurality of microphone elements is equal to the total number of the effective microphone pairs.

5. The sound pickup device according to claim 1, further comprising:

a delayer that individually delays sound signals obtained from the plurality of microphone elements;

a first signal generator that generates a first signal by adding up output signals from the delayer;

a second signal generator that generates a second signal by performing subtraction between two output signals corresponding to the two microphone elements of one of the effective microphone pairs, among the output signals from the delayer;

an adaptive filter that applies a filter coefficient to the second signal;

a subtractor that subtracts, from the first signal generated, the second signal to which the filter coefficient has been applied; and a coefficient updater that updates the filter coefficient, based on a third signal obtained by the subtraction performed by the subtractor.

* * * * *